United States Patent [19]

Iwaki et al.

[11] Patent Number: 5,619,596

[45] Date of Patent: Apr. 8, 1997

[54] METHOD AND APPARATUS FOR OPTICAL PATTERN RECOGNITION

[75] Inventors: Tadao Iwaki; Nobuyuki Kasama; Shuhei Yamamoto; Toshiharu Takesue; Yasuhiro Takemura, all of Tokyo, Japan

[73] Assignees: Seiko Instruments Inc.; Sumitomo Cement Co. Ltd., both of Japan

[21] Appl. No.: 132,660

[22] Filed: Oct. 6, 1993

[51] Int. Cl.$^6$ ............................ G06F 15/336; G06K 9/74
[52] U.S. Cl. ..................... 382/278; 382/280; 382/210; 359/559; 359/561
[58] Field of Search ................ 382/31, 42, 43, 382/41, 210, 211, 278, 280, 276, 218; 359/560, 561, 56, 559

[56] References Cited

U.S. PATENT DOCUMENTS

| | | | |
|---|---|---|---|
| 3,779,492 | 12/1973 | Grumet | 244/3.17 |
| 5,168,382 | 12/1992 | Tsujikawa | 359/56 |
| 5,175,775 | 12/1992 | Isaki et al. | 382/31 |
| 5,214,508 | 5/1993 | Stevens | 382/280 |
| 5,216,541 | 6/1993 | Takesue et al. | 782/280 |
| 5,274,716 | 12/1993 | Mitsuoka et al. | 382/280 |

*Primary Examiner*—Jose L. Couso
*Assistant Examiner*—Matthew C. Bella
*Attorney, Agent, or Firm*—Adams & Wilks

[57] ABSTRACT

An object of the invention is to provide a method and a apparatus for optical pattern recognition capable of accurately comparing and identifying a reference image accurately at a real-time even when the input image rotates or its size changes by being compared with a reference image that is a desirous target. The method and apparatus comprise the processes of; steps (6, 11) for independently obtaining a lower-frequency component and a higher-frequency component from a joint Fourier transform image 5 of the reference image 4 and the input image 3; steps (10, 15) for calculating correlation coefficients respectively from the lower-frequency component and the higher-frequency component; step (16) for obtaining a ratio of the respective correlation coefficients; and step (19) for identifying and comparing a correlation coefficient ratio of the two same reference images to be required with a correlation coefficient ratio obtained from step (16).

13 Claims, 14 Drawing Sheets

REFERENCE　　INPUT
IMAGE　　　　IMAGE

METHOD AND APPARATUS FOR OPTICAL PATTERN RECOGNITION

BACKGROUND OF THE INVENTION

In the field of optical information processing and optical measurement, the present invention relates to an apparatus which uses coherent light beams to automatically perform optical correlation processing on two-dimensional images obtained from image pick-up devices such as CCD cameras.

In recent years, the method and apparatus for pattern recognition which uses coherent light to perform correlation processing has been studied and researched. Most of the researched methods include procedures involving optical Fourier transform correlation wherein input images are optically Fourier transformed and filtered by an optical filter produced by a predetermined procedure. Thereafter the resultant is again officially Fourier transformed to obtain correlation of the input images and image information within the optical filter. The optical Fourier transform correlation apparatus include a matched filter-type optical correlator for filtering Fourier transformed images among the input images using a Fourier transform hologram of a reference image as the optical filter and a joint transform optical correlator for optically Fourier retransforming a joint Fourier transform hologram that is produced from joint Fourier transform images by Fourier transforming simultaneously both the input image and the reference image. The matched filter-type optical correlator, which has a large SN ratio in spite of its difficult alignment, is suitable for an accurate optical pattern recognition. The joint transform optical correlator, which is capable of completing a correlation by only one process with an extremely easier adjustment, is suitable for real-time optical pattern recognition.

Recently, the conventional optical Fourier transform correlation method has been considerably upgraded in its SN ratio by binarizing the optical filter. In addition, liquid crystal type televisions, light addressed type liquid crystal spatial light modulators, and various kinds of photorefractive crystal and like materials have been used as a recording medium of the optical filter instead of the conventional silver photographic plate, and various intensive studies have been undertaken for real-time optical pattern recognition.

However, optical pattern recognition methods other than the conventional optical Fourier transform correlations produce problems in that, when the input image is rotated or its size is changed relative to the reference image recorded in the optical filter, the correlation output is suddenly lowered to substantially degrade the optical pattern recognition.

To solve such drawbacks, there have been efforts made; namely, using as an optical filter the hologram produced at one processing by multiplexing the reference image having various rotating directions and sizes; and employing the optical filter obtained by printing on the photographing plate a synthesized discriminant function that is a computer generated hologram (CGH) capable of hardly reducing a correlation output even when rotation or size change arise in the computer. But, these methods are not suitable for real-time optical pattern recognition because the correlation output is obtained only for a limited variation value of rotation or size change and simultaneously, the formation of the optical filter comes complicated.

Also, the effort is made for the optical Fourier transform correlation using both of the input image and the reference image so that the images are optically coordinate converted into images whose rotation or size change substantially do not occur even when the input image rotates or its size changes. For such coordinate conversion, there are well known a polar coordinate conversion, 1nr-θ conversion, and Hough transform and the like, those of which are substantially based on the polar coordinate conversion, where problems arise Sn periodical large change of an output relative to a change of rotation angle due to having many values for the angle component, in addition, complication occurs in producing the computer generated hologram for the coordinate conversion. This coordinate conversion must be performed as an initial stage of processing in the optical Fourier transform correlator, thus tasks are required to produce the computer generated hologram with an extremely higher diffraction efficiency.

SUMMARY OF THE INVENTION

An object of the present invention is to provide an optical pattern recognition method and an optical pattern recognition apparatus capable of comparing or identifying the reference image accurately at a real-time processing rate even when the input image is rotated or its size is changed in comparison with the reference image that is a desirous target.

To solve the above object and others, the method of optical pattern recognition, and the optical pattern recognition apparatus according to the present invention achieves an optical pattern recognition by performing the steps of; employing an arrangement wherein a higher-frequency component and a lower-frequency component of a joint Fourier transform hologram with a reference image Fourier transform hologram or a reference image and an input image are independently recorded in an optical filter of the conventional Fourier transform correlator; independently obtaining correlation outputs by using the optical filter record of such lower-frequency component and the optical filter record of the higher-frequency component; computing intensity ratio of the correlation output from the obtained lower-frequency component versus the correlation output from the obtained higher-frequency component; and comparing a correlation output from a lower-frequency component previously obtained by using the reference image or two reference images with intensity ratio of the correlation output from the higher-frequency component. A method of optical pattern recognition and an optical pattern recognition apparatus according to the present invention are therefore able to execute a powerful pattern recognition with simplified method and construction irrespective of rotation or size change of the input image because the intensity ratio of the correlation outputs have proper values for the images and possess a characteristic that is barely varied with rotation or size change of the input image, and thereby the processing tasks are solved.

A real-time optical pattern recognition can be realized by employing an optically addressed ferroelectric liquid crystal spatial light modulator or a liquid crystal television as an optical filter.

DETAILED DESCRIPTION OF THE INVENTION

Figure 1:
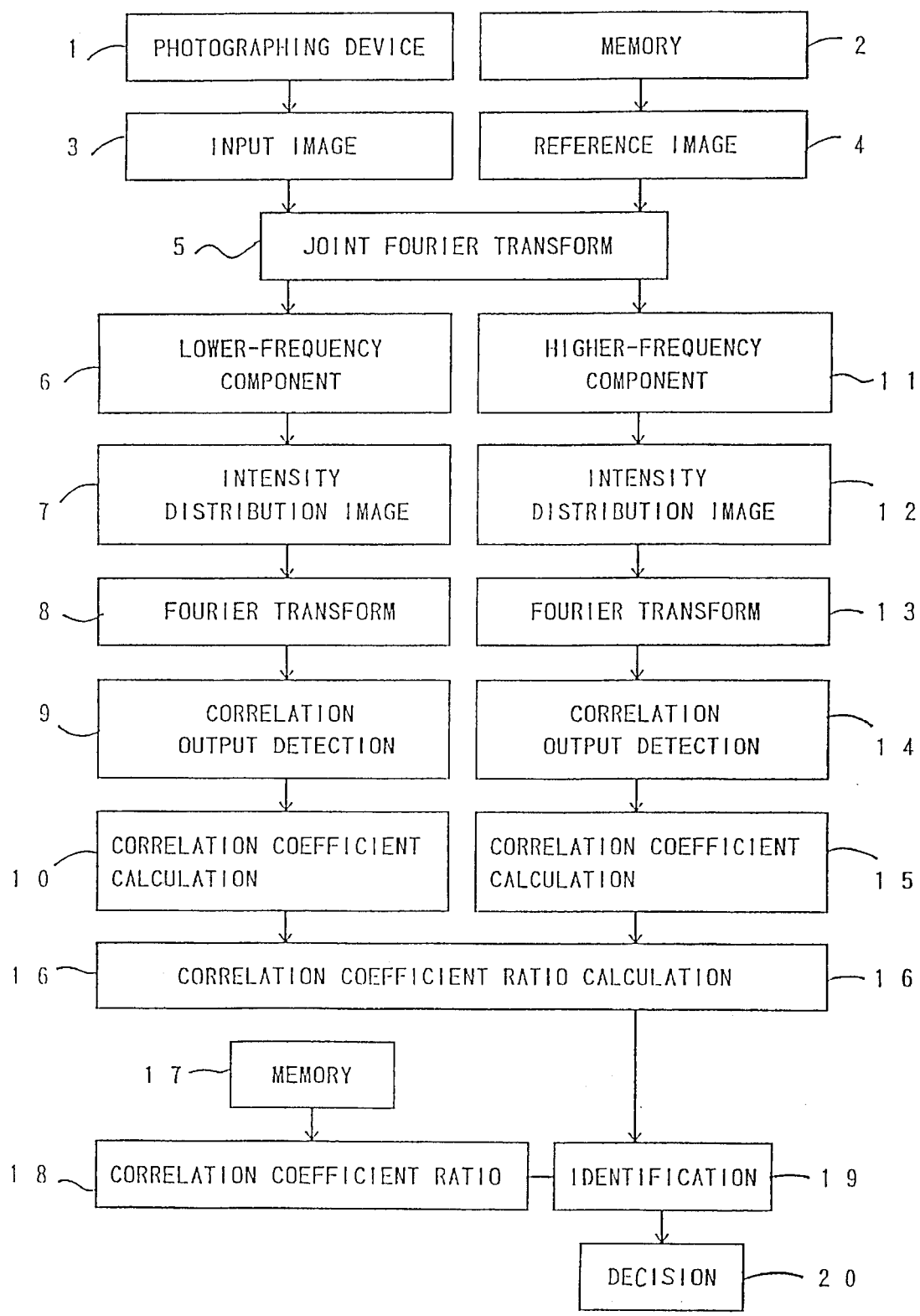
FIG. 1 is a flow chart showing a flow of an optical pattern recognition method of the invention using a joint transform correlator.

Assume that an input function $F(k)$ is transformed to $F(k+\Delta v)$ by rotation or size change of an input image "f", where "f" represents a transmission amplitude function of the input image, "g" represents a transmission amplitude function of the reference image, $F(k)$ and $G(k)$ represent transmission amplitude functions after Fourier transforms of "f" and "g" respectively, and $\Delta v$ represent a generalized transform parameter in a wave number space. With a sufficiently small value of $\Delta v$, the transmission amplitude function $F(k+\Delta v)$ after the transformation of the input function may be expressed using the transmission amplitude function $F(k)$ before the transform as the following:

$$F(k+\Delta v)=F(k)+(\delta F/\delta k)(dk/dv)\Delta v \qquad (1)$$

Consequently, Fourier transformation of the above after filtering by the optical filter formed of the hologram produced from Fourier transform $G(k)$ of the reference image (referred to as "matched filter-type optical correlation processing"), provides its output $P_m$ satisfying the following equation:

$$P_m = f\star g + \Delta v \cdot \delta_m(f\star g) + f\star g + \Delta v \cdot \delta_m(f\star g) + DC \qquad (2)$$

where $\star$ represents a correlation operator, $\star$ a convolution operator, and DC a DC component and wherein:

$$\delta_m(f\star g)=\int(\partial/\partial v)|F\star(x-k)G(k)|^2\cdot\exp(-ikx)dk \qquad (3)$$

$$\delta_m(f\star g)=\int(\partial/\partial v)|F\star(k-x)G(k)|^2\cdot\exp(-ikx)dk \qquad (4)$$

where $F\star$ is the complex conjugate of F.

After the transformed input image and the reference image are simultaneous Fourier transformed to produce a joint Fourier transform intensity distribution image, the resultant is again Fourier transformed (joint transform correlation processing), and the output $P_j$ satisfies the following equation:

$$P_j=f\star g+(\Delta v/2)\cdot\delta_j(f\star g)+DC \qquad (5)$$

Here, the following formula is defined:

$$\delta_j(f\star g)=\int(\partial/\partial v)[|F\star(x-k)G(k)|^2+|G\star(x-k)|^2]\exp(-ikx)dk \qquad (6)$$

A first term and a second term with respect to equations (2) and (5), or correlation output terms are formed of a lower-frequency component and higher-frequency component, which satisfy the following equations:

$$f\star g+\Delta v\cdot\delta_m(f\star g)=(f\star g)_L+\Delta v\cdot\delta_m(f\star g)_L+(f\star g)_H+\Delta v\cdot\delta_m(f\star g) \qquad (7)$$

$$f^*g + (\Delta v/2)\cdot\delta_j(f^*g) = (f^*g)_L + (\Delta v/2)\cdot\delta_j(f^*g)_L + \qquad (8)$$
$$(f^*g)_H + (\Delta v/2)\cdot\delta_j(f^*g)_H$$

A ratio of the lower-frequency component and higher-frequency component of the correlation output comes to the following equations for the matched filter-type optical correlator and the joint transform correlator respectively.

$$\rho_m=[(f\star g)_H+\Delta v\cdot\delta_m(f\star g)_H]/[(f\star g)_L+\Delta v\cdot\delta_m(f\star g)_L] \qquad (9)$$

$$\rho_j=[(f\star g)_H+(\Delta v/2)\cdot\delta_j(f\star g)_H]/[(f\star g)_L+(\Delta v/2)\cdot\delta_j(f\star g)_L] \qquad (10)$$

where $\rho_m$ represents a ratio of a lower-frequency component and a higher-frequency component of a correlation output in the matched filter-type optical correlator, $\rho_j$ represents a ratio of a lower-frequency component and a higher-frequency component of a correlation output in the Joint transform correlator. Consequently, a transform of the input image or a transform of Fourier transform image $(\partial F/\partial k)$ $(dk/dv)$ $\Delta v$ is sufficiently smaller. When the following condition exists:

$$\rho_m\sim\rho_f\sim(f\star g)_H/(f\star g)_L=\text{constant} \qquad (11)$$

the ratio of the lower-frequency component and higher-frequency component of the correlation output becomes invariant. In other words, in the matched filter-type correlator and the joint Transform correlator, the ratio of the lower-frequency component and higher-frequency component of the correlation output is invariable as long as such variable amount is sufficiently smaller even when the input image rotates or its size varies.

Since the lower-frequency component of the correlation output corresponds to correlation relative to rough features of the image and the higher-frequency component of the correlation output corresponds to correlation relative to fine features of the image, these ratios feature the qualities of each image itself. Therefore, a pattern recognition which is less affected by rotation or size change of the input image, becomes possible by identifying the ratio of the lower-frequency component and higher-frequency component of the correlation output obtained from the input image and the reference image with a ratio of a lower-frequency component and a higher-frequency component of a correlation output previously obtained among the reference images.

A preferred method of recording and modulating independently the lower-frequency component of the Fourier transform hologram or joint Fourier transform hologram and the higher-frequency component of the same is described with respect to the light addressed-type ferroelectric liquid crystal spatial light modulator.

Figure 5:
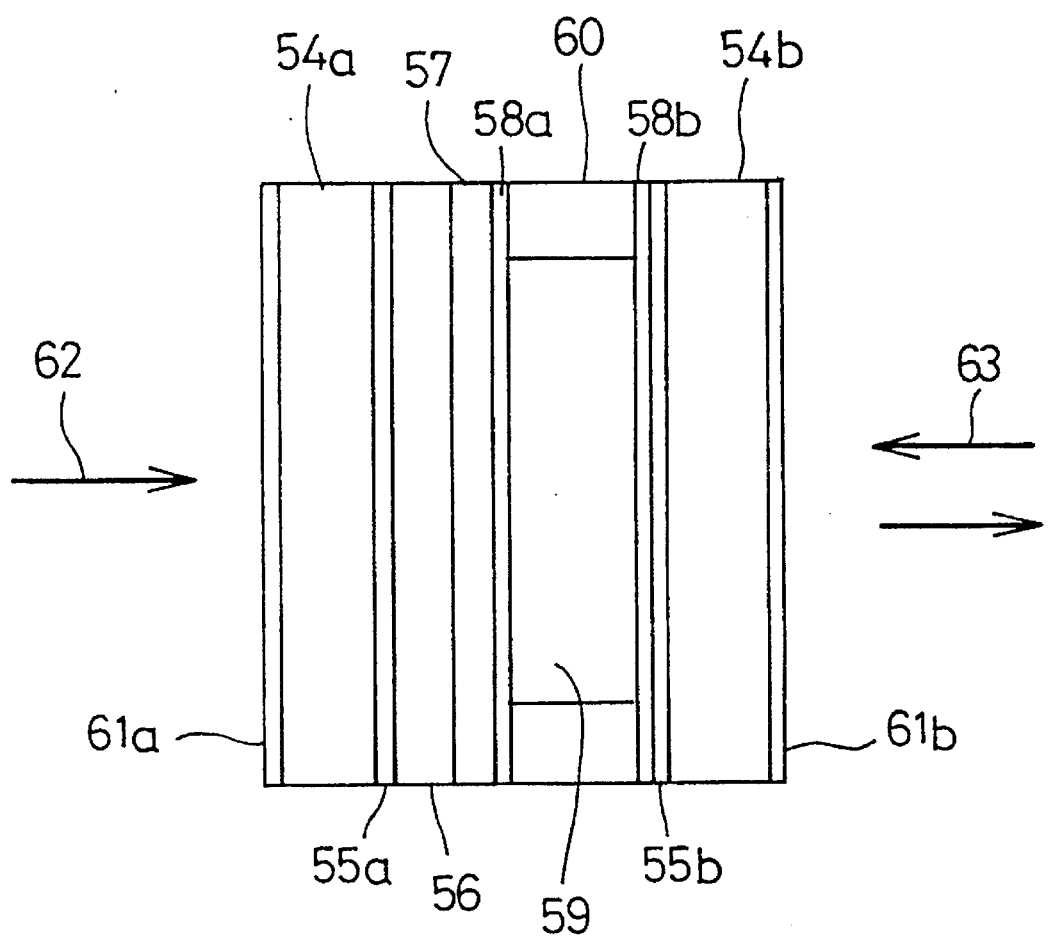
FIG. 5 is a schematic sectional view showing a light addressed-type ferroelectric liquid crystal spatial light modulator used in an optical pattern recognition apparatus according to the invention.

FIG. 5 is a schematic sectional view showing a configuration of one embodiment of the light addressed-type ferroelectric liquid crystal spatial light modulator used in and embodiment of the present invention. In the light addressed-type ferroelectric liquid crystal spatial light modulator in FIG. 5, a transparent electrode 55a such as ITO (Indium-Tin-Oxide) or the like is formed on a transparent substrate 54a represented by quartz glass and the like having typically a flatness degree of equal to or more than $\lambda/8$, further on which is formed intrinsic hydrogenated amorphous silicon (a-Si:H) 56 with a thickness of about 1.5 to 3 μm.

A dielectric mirror 57 is deposited on a-Si:H 56 for increasing the reflection factor for read-out light as much as possible. The dielectric mirror 57 is formed by, for example, a construction laminated alternately with an oxide having a high reflection factor $\lambda/4$ such as laminating silicon, a compound of silicon and germanium titanium oxide or zirconium oxide, or the like, and an oxide of a low reflection factor $\lambda/4$ such as silicon dioxide, magnesium fluoride, or the like. A transparent electrode 55b similar to the transparent electrode 55a is formed on a transparent substrate 54b which is similar to the transparent substrate 54a. The transparent electrode 55b and the dielectric mirror 57 are formed thereon with alignment films 54a and 54b such as SiO by oblique evaporation methods or polyimide by a rubbing process or like processes. These transparent substrates 54a and 54b hold a layer of ferroelectric liquid crystal 59 through a spacer 60 so that the alignment films 58a and 58b are opposed at an inside surface with each other. Anti-reflection coatings 61a and 61b are formed on an outside surface of the transparent substrates 61a and 61b.

The light addressed-type ferroelectric liquid crystal spatial light modulator thus constructed records an image by irradiating a write light 62 from the transparent substrate 54a-side formed of a-Si:H 56, and reads the recorded image by irradiating with a read light 63 from the transparent substrate 54b-side at opposite side thereof.

Figure 7:
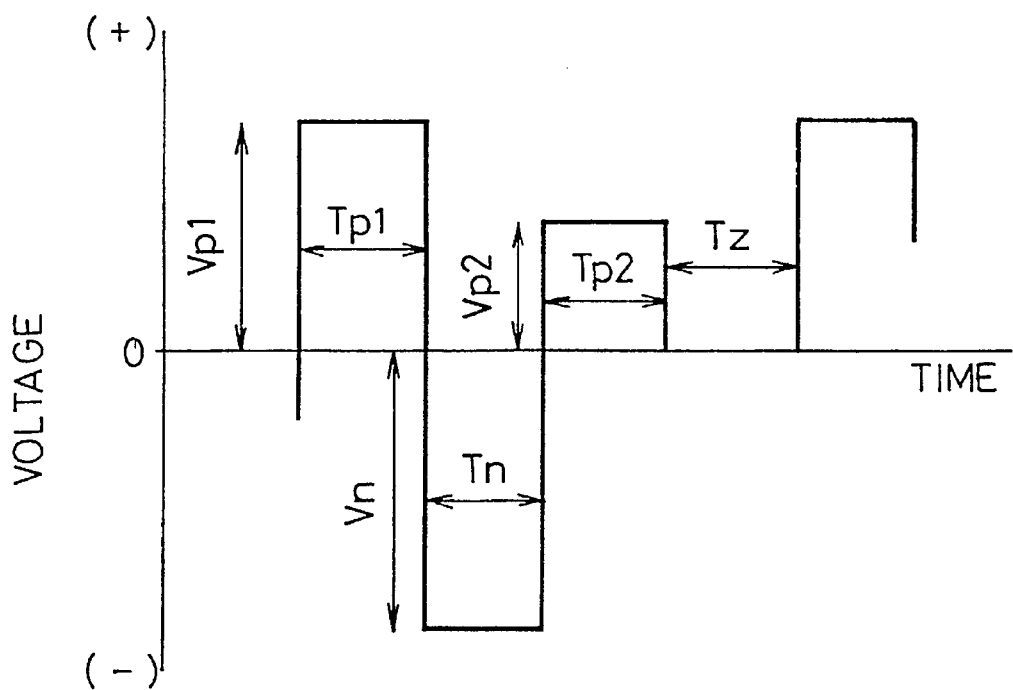
FIG. 7 is a graphical representation showing a voltage waveform applied to a light addressed type ferroelectric liquid crystal spatial light modulator in order to realize the threshold characteristic for the writing light intensity in FIG. 6.

A continuous pulse voltage sequence composed of a set of a positive pulse voltage, a negative pulse voltage, a positive pulse voltage, and zero voltage as shown in FIG. 7 is applied across the transparent electrodes 55a and 55b of the light addressed type ferroelectric liquid crystal spatial light modulator.

Assume that the first positive voltage has a pulse peak of Vp1 with a pulse width of Tp1, that the negative voltage has a pulse peak of Vn with a pulse width of Tn, that the second positive voltage has a pulse peak of Vp2 with a pulse width of Tp2, and that the zero voltage has a width of Tz. Then, a period of the continuous pulse voltage is Tp1+Tn+Tp2+Tz. If the negative voltage and the second positive voltage are applied for obtaining the condition Vp1>=Vn>Vp2, a threshold value for writing light (a critical writing light intensity on which ferroelectric liquid crystal molecules are inverted and transferred to the other stable state) is inversely proportional to the applied voltage, thus the threshold value Ithn of the writing light for the negative voltage is smaller than the threshold value Ithp2 for the second positive voltage, the threshold value Ithp1 for the first positive voltage is smaller than or equal to the threshold value Ithn for the negative voltage.

Consider that the writing light intensity is larger than Ithn and smaller than Ithp2. The liquid crystal is initialized at a unidirectional stable state by the first positive voltage, thereafter a portion irradiated by the writing light at a negative voltage is inverted of its liquid crystal molecules and the images are written. However, even if the second positive voltage is applied, a writing light having smaller intensity than the threshold value of the writing light is irradiated, the molecules irradiated by the writing light do not return to the original stable state with the second positive voltage applied. In such a case, the liquid crystal molecules at a portion irradiated by the writing light take a stable state opposite to the stable state prepared at the initialization, thus the images can be recorded in the light addressed type ferroelectric liquid crystal spatial light modulator.

Considering a writing light having an intensity larger than Ithp2, similarly the liquid crystal molecules are initialized at a unidirectional stable state at the first positive voltage, thereafter a portion irradiated by the writing light at the negative voltage is inverted of its liquid crystal molecules and the images are written. However, if the second positive voltage is applied, a writing light having larger light-intensity than the threshold value of the writing light therefore is irradiated, the liquid crystal molecules at a position irradiated by the writing light are inverted to the stable state prepared at the initialization. In such a case, the liquid crystal molecules at the position irradiated by the writing light take the same stable state as that prepared at the initialization, thus it is impossible to record the images in the light addressed type ferroelectric liquid crystal spatial light modulator.

It is of course that if the writing light intensity is smaller than Ithp1, the image can not be recorded in the light addressed type ferroelectric liquid crystal spatial light modulator.

Figure 6:
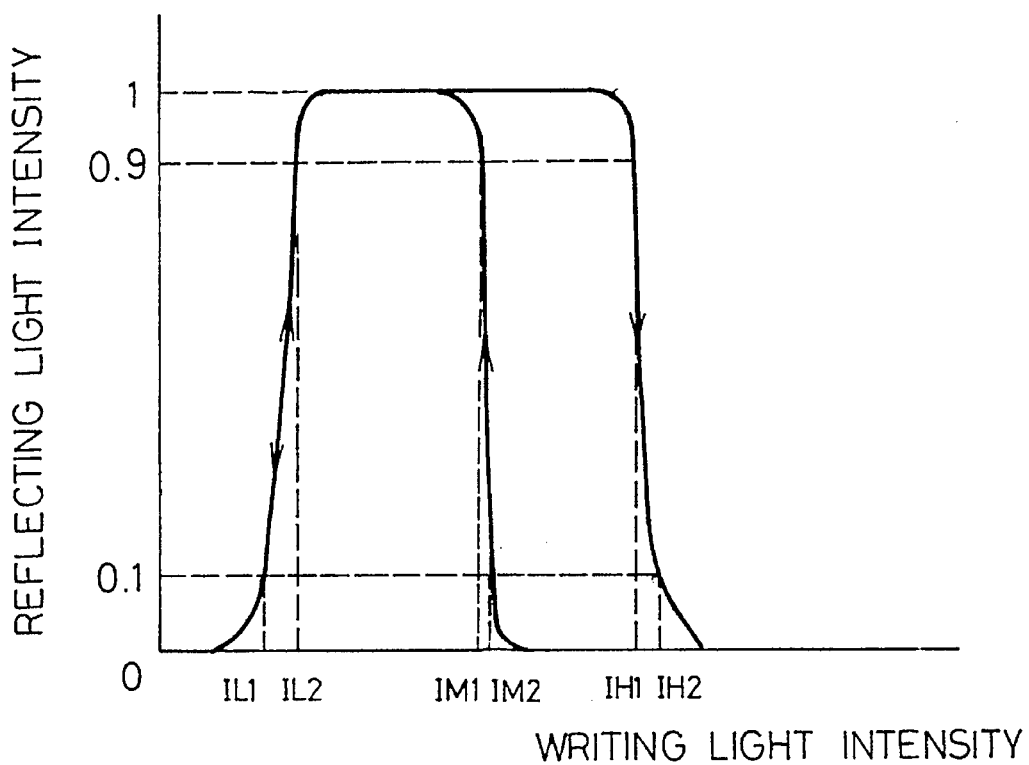
FIG. 6 is a graphical representation showing a threshold characteristic for writing light intensity with respect to the light addressed-type ferroelectric liquid crystal spatial light modulator in FIG. 5.

In this way, by continuously applying the pulse voltage waveform scheme shown in FIG. 7, the light addressed-type ferroelectric liquid crystal spatial light modulator comes to have a threshold characteristic for the writing light intensity as shown in FIG. 6. Under the condition that the same driving pulse voltage is continuously applied, if the writing light intensity is gradually increased, reflection light intensity from the light addressed-type ferroelectric liquid crystal spatial light modulator is suddenly increased at a certain level of the writing light intensity (the image comes to be recorded).

If the writing light intensity is gradually made larger, reflection light intensity from the light addressed-type ferroelectric liquid crystal spatial light modulator is suddenly decreased at certain writing-light intensity level (the image is erased). Therefore, the writing light intensity is decreased, reflection light intensity from the light addressed-type ferroelectric liquid crystal spatial light modulator is suddenly increased at a certain writing light intensity level (the image can again be recorded).

If the writing light intensity is decreased again, reflection light intensity from the light addressed type ferroelectric liquid crystal spatial light modulator is again decreased from a certain writing-light intensity level (the image is erased). The ferroelectric liquid crystal has clear bistability, and its variation of the reflection light intensity is ideally either zero or 1. Practically, a characteristic curve represented by change of the reflection light intensity is somewhat tilted at a changing point by inhomogeneity of the alignment or non-uniformity of the writing light intensity, hence the threshold value level is not identified. Thus, in accordance with the maximum point of the reflection light intensity, reflection light intensity, which comes equal to 0.1 and 0.9, is defined as a threshold value of the light addressed-type ferroelectric liquid crystal spatial light modulator.

General example in FIG. 6 takes six threshold values of IL1, IL2, IM1, IM2, IH1, IH2, but IL1~IL2, IM1~IM2, IH1~IH2 are provided, then IL=IL1~IL2, IM=IM1~IM2, and IH=IH1~IH2 can be placed without problem. In this invention, IL is called a first threshold value, IH is called a second threshold value throughout.

The threshold characteristic for the writing light of the light addressed-type ferroelectric liquid crystal spatial light modulator in FIG. 6 has hysteresis, whose cause is not yet known. However, this does not provide an adverse effect to the present invention.

This invention is not limited to the light addressed type ferroelectric liquid crystal spatial light modulator, and, it is understood by those skilled in the art that the same threshold value characteristic for the write light as described above can be obtained even in using a light addressed-type spatial light modulator having the construction shown in FIG. 5 that employs light modulation members having a bistability for the applied voltage instead of the ferroelectric liquid crystal.

FIG. 8 shows Fourier transform image intensity distribution written in the light addressed-type ferroelectric liquid crystal spatial optical modulator when the Fourier transform image is modulated while on the other hand a continuous driving pulse voltage as shown in FIG. 7 is being applied to the light addressed-type ferroelectric liquid crystal spatial light modulator in FIG. 5.

Figure 8A:
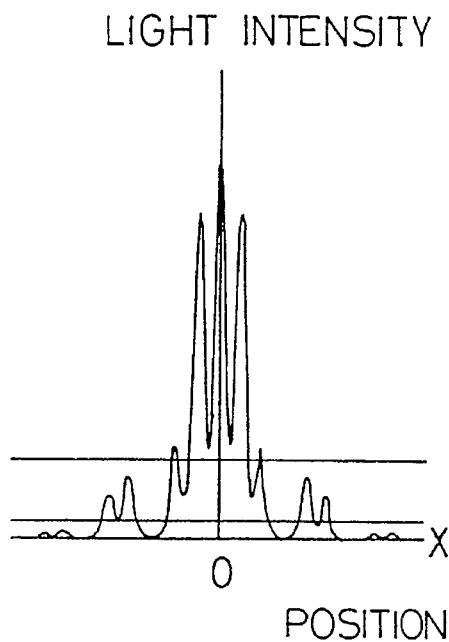
FIG. 8 is graphical representations showing Fourier transform image intensity distributions recorded when Fourier transform images are written into a light addressed-type ferroelectric liquid crystal spatial light modulator while the driving voltage is being applied as in FIG. 7.

FIG. 8(A) shows the Fourier transform image intensity distribution as a writing image, designating one having a lower visibility, where, if the writing light intensity is of sufficient magnitude, light intensity of the lower-frequency component of the Fourier transform image is larger than the second threshold value of IH. Thus, the intensity distribution of an image, which is written in and read from the light addressed-type ferroelectric liquid crystal spatial light modulator, is as shown in FIG. 8(c), wherein only the higher-frequency component is read. A Fourier transform image having a low visibility as in FIG. 8(a) can easily be obtained by Fourier transforming the image having a lowered contrast ratio or by Fourier transforming the image by a laser beam having a lowered coherency.

Figure 8B:
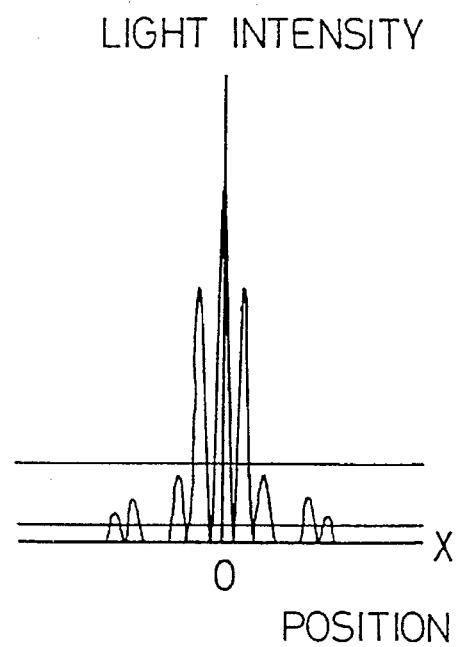
Figure 8C:
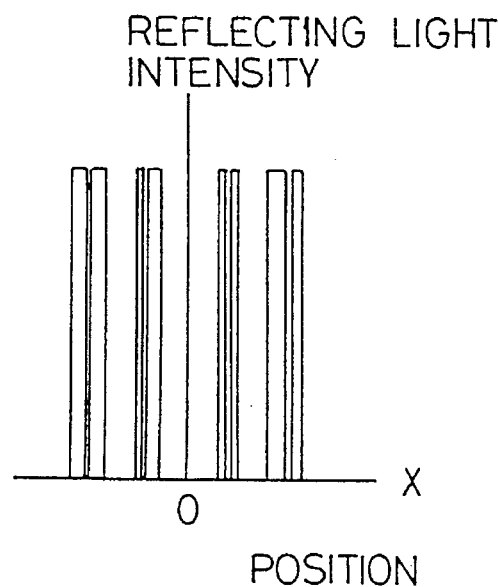
Figure 8D:
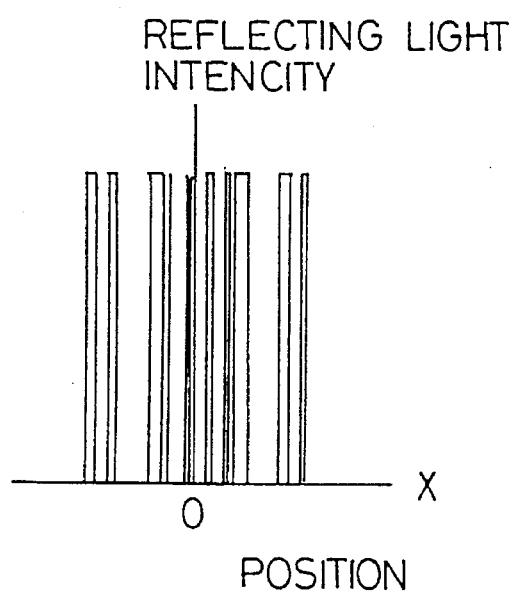

When a Fourier transform image having a high visibility in FIG. 8(b) is written into the light addressed-type ferroelectric liquid crystal spatial light modulator while applying a continuous driving pulse voltage as shown in FIG. 7, then a reading image as shown in FIG. 8(d) can be obtained if the writing light is sufficiently intense. The higher-frequency component of the Fourier transform image is correctly binarized and written into the light addressed-type ferroelectric liquid crystal spatial light modulator, the lower-frequency component of the Fourier transform image is written of its edge portion only, and the Fourier transform image having such a high visibility can easily be obtained by Fourier transforming the image having a high contrast ratio using the laser beam having a high coherency. In this way, only the higher-frequency component of Fourier transform image is selected and can be written into the optical addressed-type spatial light modulator.

Moreover, only the lower-frequency component of the Fourier transform image can be written by writing the Fourier transform image into the light addressed-type ferroelectric liquid crystal spatial optical modulator at writing light intensity that enables a maximum value of the light intensity distribution of the Fourier transform image to be smaller than the second threshold value IS. In most cases, this is because the high-frequency component of the Fourier transform image is as low as an extent of 1/10 to 1/1000 of the low-frequency component, and comes lower than the first threshold value IL of the light addressed-type ferroelectric liquid crystal spatial light modulator, this results in an inability to write. In this manner, only the higher-frequency component of the Fourier transform image is selected and can be written into the light addressed-type spatial light modulator.

Of course, a peak value of second positive voltage pulse in FIG. 7 may preferably be changed, without changing the writing light intensity, as a method such that the lower-frequency component and the higher-frequency component of the Fourier transform image can selectively be written into the light addressed-type ferroelectric liquid crystal spatial light modulator.

Embodiments for a method of optical pattern recognition and an optical pattern recognition apparatus according to the present invention are explained referring to the drawings as undermentioned.

FIG. 1 is a flow chart showing an embodiment constituting an optical pattern recognition method based on a joint transform correlator according to the present invention. In FIG. 1, a joint Fourier transform image is formed in that by a coherent light there is simultaneous Fourier transformed images; namely, an input image 3 input from image pick-up devices 1 such as CCD cameras or vidicons; and a reference image read from memories such as RAM (Random Access Memory) or ROM (Read Only Memory) in computers or external memories (hard disks or floppy disks or optical disks) or photography film or the like (joint Fourier transform 5). The joint Fourier transform images are called interference-fringe distributions formed in that the input image Fourier transform and the reference image Fourier transform image are superimposed on an optical axis and interfered with each other, which is referred to as a Fourier transform hologram.

The joint Fourier transform image thus obtained transforms into a lower-frequency component 6 and a higher-frequency component 11 independently into intensity distribution images 7 and 12, for example as hereinbefore described, using a light addressed type ferroelectric liquid crystal spatial light modulator. The intensity distribution image 7 of the lower-frequency component 6 of the joint Fourier transform image 5 and the intensity distribution image 12 of the higher-frequency component 11 of the joint Fourier transform image 5 are independently Fourier transformed once again (8, 13) to produce correlation images, correlation outputs of which are detected by the CCD cameras or the vidicons or photodiodes (9, 14). Correlation coefficients are calculated by the computers or electronic logic using correlation peaks intensity measured from such detected correlation outputs (10, 15). Series of steps 6 to 15 for obtaining the correlation coefficients are preferably carried out sequentially in series, or steps 6 to 10 and steps 11 to 15 may be alternatively in a parallel manner by substantially operating two joint transform correlators simultaneously. Thus, correlation coefficient ratios are calculated by the computers or electronic logic using the thus obtained coefficients; namely, the correlation coefficient corresponding to the lower-frequency component 6 of the joint Fourier transform 5; and the correlation coefficient corresponding to the higher-frequency component 11 of the joint Fourier transform 5 (16).

In the memory 17, a ratio of the correlation coefficient obtained from the lower-frequency component versus the correlation coefficient obtained from the higher-frequency component is stored in a manner of corresponding to the same two reference images which have been used for obtaining the joint Fourier transform in the above processes. Comparing a correlation coefficient ratio 18 read from the memory 17 with the correlation coefficient ratio obtained from the step 16 (19), it is determined whether or not the input image 3 and the reference image 4 are identical to each other depending on whether or not a difference or a ratio of these numerical values is within a range of a predetermined value (20). The range of numerical values that is a criterion is determined in consideration of overall situation by factors such as SN ratio of the detected correlation output, kinds of the reference images (difference among the images such as characters or sights or the like), the number of the reference images, and a probability of decision.

Figure 3:
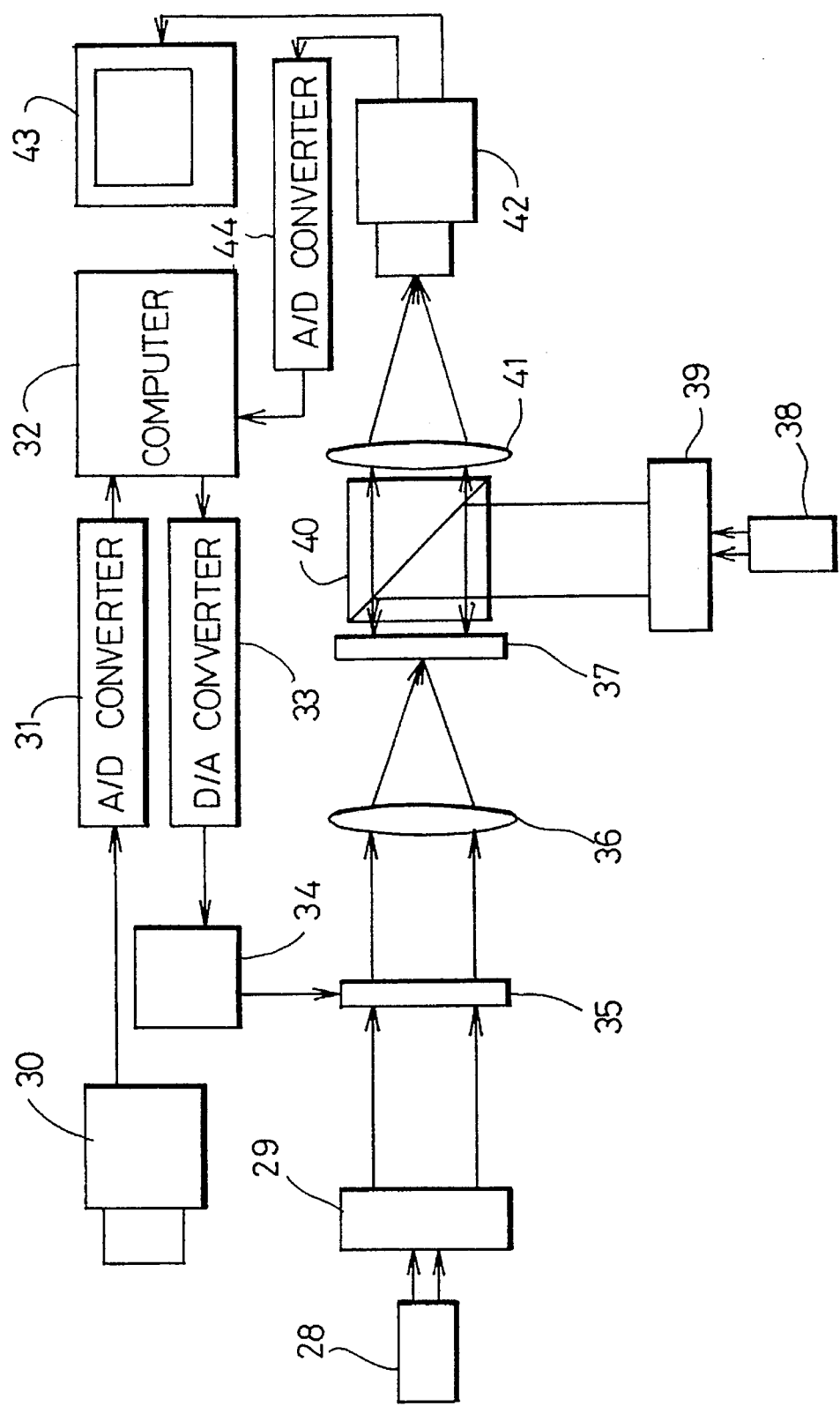
FIG. 3 is a view showing a configuration of one embodiment of an optical pattern recognition apparatus of the invention using a joint transform correlator.

FIG. 3 is a view more concretely showing an optical pattern recognition method of the present invention in FIG. 1. FIG. 3 shows a configuration of one preferred embodiment of the optical pattern recognition apparatus of the invention, where reference numeral 28 depicts a writing laser, 29 a first beam expander, 30 a first CCD camera, 31 and represent 44 A/D converters, 32 represents a computer, 33 a D/A converter, 34 a liquid crystal television driving circuit, 35 a liquid crystal television, 36 a first Fourier transform lens, 37 a light addressed-type ferroelectric liquid crystal spatial light modulator, 38 a reading laser, 39 a second beam expander, 40 a polarizing beam splitter, 41 a second Fourier transform lens, 42 a second CCD camera, and 43 a video monitor.

In FIG. 3, the input image entered from the first CCD camera 30 and including an object image is converted into digital signals by the A/D converter 31, and thereafter is entered into the computer 32. In the computer 32, the reference image previously stored in its memory and the input image previously entered are placed adjacent with each other and synthesized together, the resultant are again converted into the analog signals by the D/A Converter 33 to be displayed on the liquid crystal television 35 through the liquid crystal television driving circuit 34.

Figure 11:
FIG. 11 is a view showing an example of an input image of an optical pattern recognition apparatus of the invention using a joint transform correlator.

One example of the image thus displayed on the liquid crystal television 35 is shown in FIG. 11, where alphabetic characters B as an input image and a reference image are placed adjacent each other and displayed in the liquid crystal television. In FIG. 11, generally the input image, when entering, is rotated or its size is changed relative to the reference image. In this example, the reference image is rotated by 10 degrees relative to the input image, and is larger in size by about 36% than the input image.

In FIG. 1, it may be preferable that two liquid crystal televisions are arranged adjacent with each other instead of the liquid crystal television 35, where one liquid crystal television displays the input image from the first CCD camera 30 and the other liquid crystal television displays the reference image from the computer 32.

In FIG. 3, the coherent light emitted from the writing laser 28 is converted into a beam having a suitable diameter by the first beam expander 29, and thereafter the input image and the reference image displayed on the liquid crystal television 35 are simultaneously read and converted into the coherent image. In this embodiment, the input image and the reference image, which use a semiconductor laser with a wavelength of 690 nm capable of easy direct-modulation as a writing laser 28 and are converted into the coherent images, are Fourier transformed simultaneously by the first Fourier transform lens 36, and irradiated on a input plane of the light addressed-type ferroelectric liquid crystal spatial light modulator 37 as a joint Fourier transform. Then, a driving pulse voltage as shown in FIG. 7 is applied to the light addressed-type ferroelectric liquid crystal spatial light modulator 37. For such driving pulse voltage, a pulse peak of 10 V with a pulse width of 2 msec is given for the first positive voltage, a pulse peak of −10 V with a pulse width of 1 msec for the negative voltage, a pulse peak of 7 V with a pulse width of 0.8 msec for the second positive voltage, and 33 msec for a period of zero voltage.

The coherent light emitted from the reading laser 38 is enlarged to a suitable beam diameter by the second beam expander 39, thereafter to be reflected by the polarizing beam splitter 40, and to read the joint Fourier transform image written in the light addressed-type ferroelectric liquid crystal spatial light modulator 37. A semiconductor laser having the same wavelength of 690 nm as the writing laser is used as a reading laser 38. The read-out joint Fourier transform image, which is again transmitted through the polarizing beam splitter 40 and converted into the intensity distribution image, is thereafter again Fourier transformed into the correlation image by the second Fourier transform lens 41 to be converted into electric signals by picking up the image using the second CCD camera 42. The correlation image converted into the electric signals is observed directly by the video monitor 43, or converted into the digital signals by the A/D converter 44 to be taken into the computer 32. The input image taken into the computer 32 is detected a maximum value of the correlation peak contained therein and stored in memory of the computer 32 as a correlation coefficient.

The writing light is irradiated during application of the first positive voltage, the negative voltage, and the second positive voltage at a driving pulse voltage of the light addressed-type spatial light modulator 37 of FIG. 7, while the reading light is irradiated during the period of the zero voltage. Due to this operation, an influence of the reading light is prevented during the writing period of the joint Fourier transform image. When the reading light intensity is reduced as low as the influence of the reading light does not affect during the writing period of the joint Fourier transform image, the writing light and the reading light do not require such modulation. Needless to say that, when using a laser beam source such as a gas laser with a difficulty to be applied a direct modulation, an external modulator such as a liquid crystal shutter is disposed between the writing laser 28 and the light addressed-type ferroelectric liquid crystal spatial light modulator 37 and between the reading laser 38 and the light addressed-type ferroelectric liquid crystal spatial light modulator 37, thereby the writing light and the reading light may preferably be modulated respectively It is of course that the liquid crystal television 35 and the light addressed-type ferroelectric liquid crystal spatial light modulator 37 are arranged on a front focal plane and a back focal plane of the first Fourier transform lens 36, and the light addressed-type ferroelectric liquid crystal spatial light modulator 37 and the second CCD camera 42 are arranged on a front focal plane and a back focal plane of the second Fourier transform lens 41, respectively.

Figure 12A:
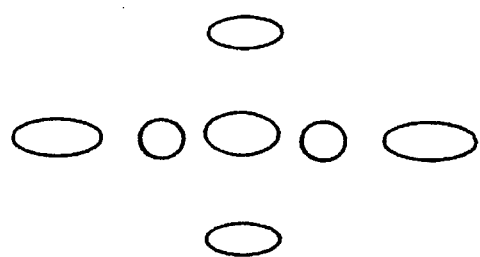
FIG. 12 shows one example of a lower-frequency component and a higher-frequency component of a joint Fourier transform image obtained when alphabetic characters B entirely without rotation and size change are used as an input image and a reference image.

In the joint transform correlator in FIG. 1, to obtain a correlation coefficient corresponding to the lower-frequency component, an output of the writing laser 28 is adjusted so that the writing light intensity is equal to an average value of about 290 μW/cm² immediately before the light addressed-type ferroelectric liquid crystal spatial light modulator 37. Intensity of the reading light is made 270 μW/cm². One example of the lower-frequency component of the joint Fourier transform image thus written into the light addressed-type ferroelectric liquid crystal spatial optical modulator 37 is shown in FIG. 12(a). FIG. 12(a) is the one example of the lower-frequency component of the joint Fourier transform images obtained by placing two alphabetic characters B having the same size and the same direction adjacent with each other. The joint Fourier transform images have interference fringes corresponding to carrier waves, but those are omitted in FIG. 12. Correlation coefficients obtained by Fourier transforming the joint Fourier transform images thus obtained are stored in the memory of the computer 32.

Figure 12B:
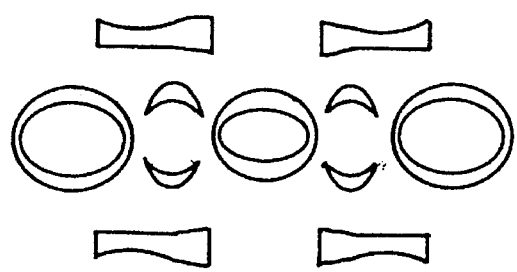

Next, to obtain a correlation coefficient corresponding to the higher-frequency component an output of the write laser 28 is adjusted so that the writing light intensity is equal to an average value of about 2.2 mW/cm² immediately before the light addressed-type ferroelectric liquid crystal spatial light modulator 37. One example of the joint Fourier transform image thus written into the light addressed-type ferroelectric liquid crystal spatial light modulator 37 is shown in FIG. 12(b). Similar to FIG. 12(a), this also is the one example of the higher-frequency component of the joint Fourier transform images obtained by placing the two alphabetic characters B having the same size and the same direction adjacent to each other. Correlation coefficients obtained by Fourier transforming the joint Fourier transform images thus obtained are stored in the memory of the computer 32.

Figure 16:
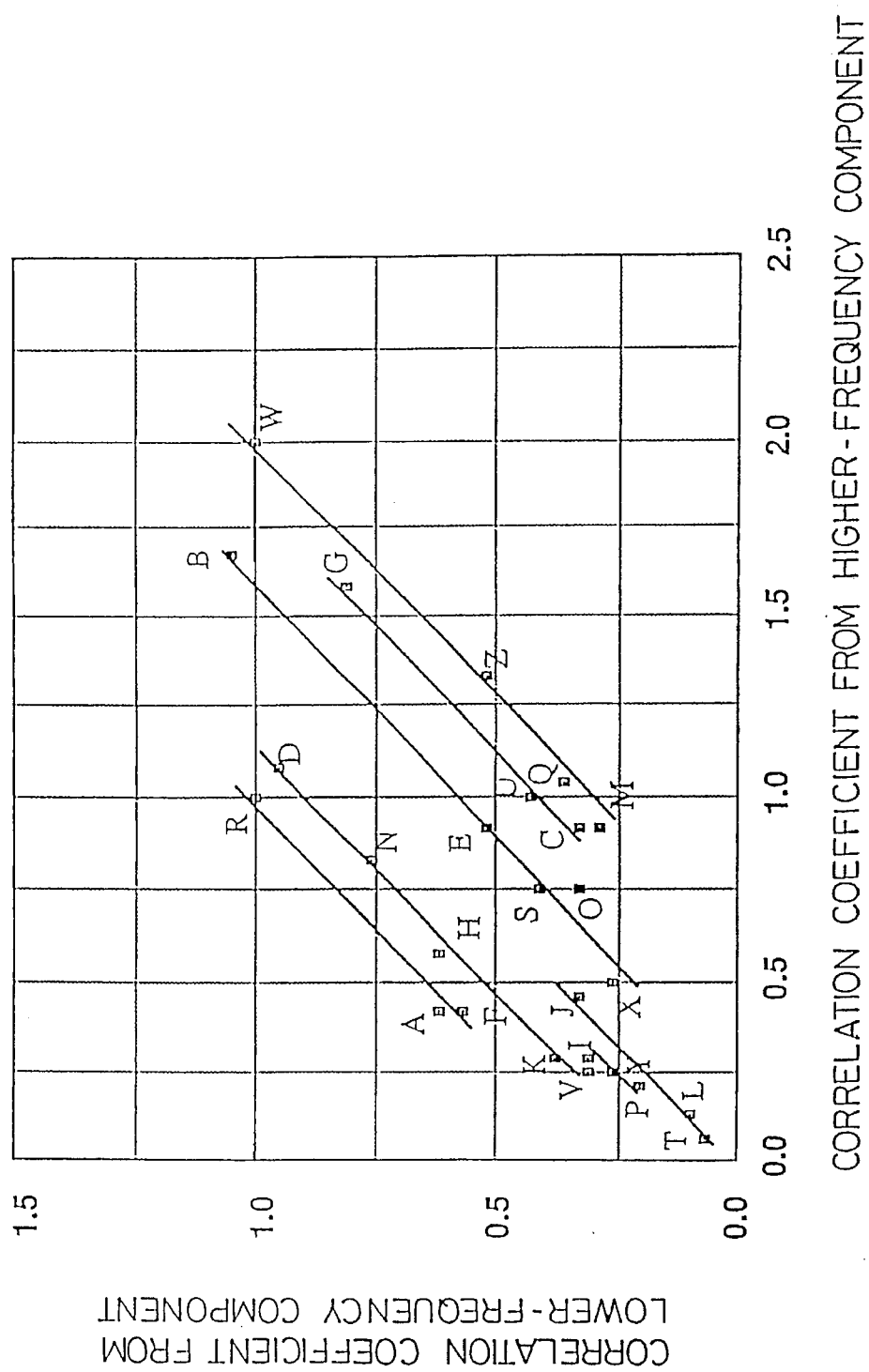
FIG. 16 is a graphical representation showing a relationship between the correlation coefficient from higher-frequency components and that from lower-ones.

The correlation coefficient corresponding to the lower-frequency component and the correlation coefficient corresponding to the higher-frequency component with respect to the input image and the reference image stored in the memory of the computer 32 are read within the computer 32, a correlation coefficient ratio that is a ratio of such values is calculated. The correlation coefficient ratio, which is obtained by placing the two alphabetic characters B having the same size and same direction adjacent with each other, is equal to about 1.55. With respect to the alphabetic characters of large letters other than B, values of the correlation coefficient corresponding to the lower-frequency component relative to the correlation coefficient value corresponding to the higher-frequency component are plotted on a graphical representation as in FIG. 16, and it is found that the plotting for sets of characters as in the following are on a straight line having substantially the same tilt. Those are (F, A, R), (V, K, It, N, D), (P, Y, I), (T, L, J), (X, S, E, B), (O, C, Q, u, G), and (M, Z, W). The characters are found to be of relatively similar constituent elements (very similar characters).

This is considered to designate that the optical pattern recognition method or the optical pattern recognition apparatus according to the present invention relatively satisfactory processes separately the lower-frequency component and the higher-frequency component with respect to the input images and the reference images. In this connection, a tangential angle of the straight line on which these sets of characters are placed has a tangential angle of about 0.8. It is noted that this tangential angle of the line somewhat varies depending on the condition of the driving pulse voltage or the writing light intensity of the light addressed-type ferroelectric liquid crystal spatial light modulator 37.

Next, it is shown and described that the optical pattern recognition method and the optical pattern recognition apparatus according to the present invention are a method and apparatus which can overcome the rotation or size change of the input images. To explain this, one example of the embodiment using the optical pattern recognition apparatus of the invention based on the joint transform correlator in FIG. 3 is described referring to the drawings. The alphabetic characters of large letters are also used in the input image and the reference image for this embodiment.

Figure 13:
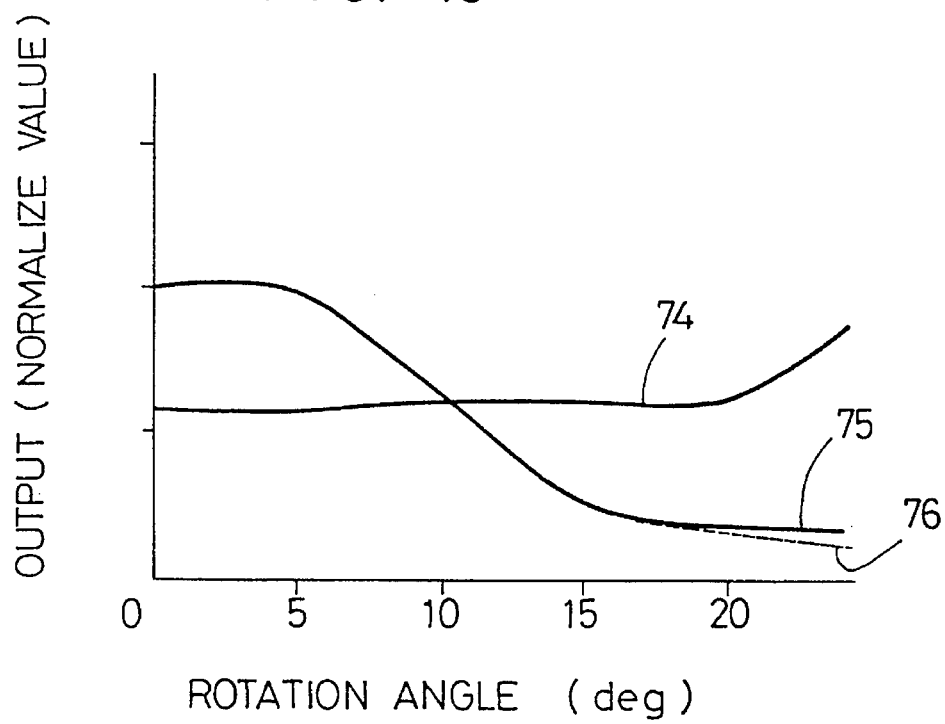
FIG. 13 is a graphical representation showing a relationship for a correlation coefficient from a higher-frequency component, a correlation coefficient from a lower-frequency component, and a correlation coefficient ratio each relative to a rotation angle of a reference image in each case of binarization of a joint Fourier transform image.

FIG. 13 is a graphical representation showing variations of a correlation coefficient 75 from the lower-frequency component, a correlation coefficient 76 from the higher-frequency component, and the correlation coefficient ratio 74 respectively when the input image is rotated without change of the size. In FIG. 13, alphabetic characters in large letters B are used as an input image and a reference image.

Values of the correlation coefficient 75 from the lower-frequency component and the correlation coefficient 76 from the higher-frequency component in FIG. 13 are normalized in accordance with the values when the input image is not rotated. As is apparent from this graphical representation, when the input image rotates, the correlation coefficient 75 corresponding to the lower-frequency component and the correlation coefficient 76 corresponding to the higher-frequency component are suddenly decreased, where a rotation of about 12 degrees of the input image provides a change of about the half of these values. In contrast, the correlation coefficient ratio 74 is only raised by about 10% when the input image rotates by about 20 degrees. Thus, the pattern recognition having an extremely upgraded withstand property for the rotation of the input image can be realized by using the correlation coefficient ratio 74.

The correlation coefficient ratio 74 has a proper value for images, which is used to enable the pattern recognition. For example, even when two images having a correlation coefficient ratio for an auto-correlation extremely close each other, these can easily be determined once the reference image is identified, because the correlation coefficient ratio for a cross-correlation of these images takes an entirely different value from the correlation coefficient ratio for the auto-correlation described. In two images, when the correlation coefficient ratio for the auto-correlation and the correlation coefficient ratio for the cross-correlation are entirely the same, then such two images are the identical image.

Figure 14:
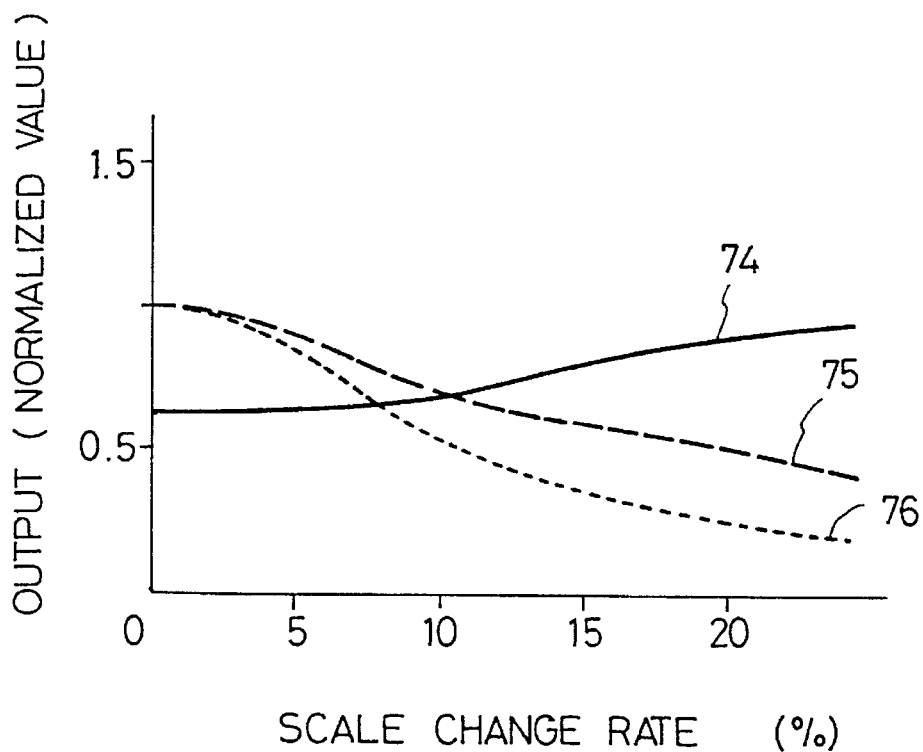
FIG. 14 is a graphical representation showing a relationship for a correlation coefficient from a higher-frequency component, a correlation coefficient from a lower-frequency component, and a correlation coefficient ratio each relative to size change of a reference image in the case of binarization of a joint Fourier transform image.

A case having a difference between sizes of the input image and the reference image is described. FIG. 14 is a graphical representation showing variations of the correlation coefficient 75 corresponding to the lower-frequency component thereof, the correlation coefficient 76 corresponding to the higher-frequency component, and the correlation coefficient ratio 74 respectively when the size of the input image varies by the optical pattern recognition apparatus of the invention based on the joint transform correlator as shown in FIG. 3. In FIG. 14, the alphabetic characters in large letters B are used as an input image and a reference image similarly as in FIG. 13. The values of the correlation coefficient 75 from the lower-frequency component and the correlation coefficient 76 from the higher-frequency component are normalized in accordance with values during the time that the size of the input image does not vary.

The horizontal axis of the graph represents an absolute value of scale change rate as a guideline value of size change of the image, where are established "(scale change rate)= (image area with size change–image area without change of size)×100/(image area without change of size)".

As is apparent from FIG. 14, it is found that variation of the input image size in this embodiment provides a change of the correlation coefficient ratio 74, scale variation of about 10% provides a change of about 10% of the correlation coefficient ratio 74. This designates, the pattern recognition capability is found to be improved in comparison with the conventional optical pattern recognition apparatus or the conventional optical pattern recognition method from the fact that the scale change of about 5 to 7% results in a variation of about 10% of the correlation coefficient 75 corresponding to the lower-frequency component and the correlation coefficient 76 corresponding to the higher-frequency component. However, this is not so satisfactory improvement of the characteristic. The reason is that a visibility of the joint Fourier transform of the input image and the reference image is suddenly deteriorated due to the size change of the input image, and in addition, the joint Fourier transform image is binarized by the light addressed-type ferroelectric liquid crystal spatial light modulator. Therefore, the joint Fourier transform image can not be written sufficiently into the light addressed-type ferroelectric liquid crystal spatial light modulator.

The deterioration of the visibility of the joint Fourier transform image is generated due to unbalance of optical power densities of the Fourier transform image of the input image and the Fourier transform image of the reference image by size change of the input image. Actually, it is known that an image having a continuous gradation can be displayed in such light addressed-type ferroelectric liquid crystal spatial light modulator by applying a positive pulse voltage and a negative pulse voltage each having satisfactory high frequency alternatively to the light addressed-type ferroelectric liquid crystal spatial light modulator. In case where, using such driving system, the joint Fourier transform image of the input image having size change and the reference image is displayed on the light addressed-type ferroelectric liquid crystal spatial light modulator to obtain the same graph as in FIG. 14, the correlation coefficient ratio is found to change as low as about 10% even in changing the input image by as high as 20 to 24%. Substantially, using the optical pattern recognition method and the optical pattern recognition apparatus according to the present invention it is possible to carry out an accurate pattern recognition even when the input image or the reference image rotate or their sizes change.

However, binarization of the joint Fourier transform image relatively provides a higher SN ratio for the correlation output without problem and is reasonable as a driving method of the light addressed-type ferroelectric liquid crystal spatial light modulator. Here, the similar graph as in FIG. 14 has been made up by displaying on the liquid crystal television 35 the input image and the reference image each having a gradation such that a light intensity transmitted through the input image and the reference image displayed on the liquid crystal television 35 in FIG. 3 is maintained constant. Such display of the reference image and the input image comes possible by way that a brightness of a displayed portion of the image in the liquid crystal television 35 can be varied inversely proportional to the image size.

In this embodiment, because the largeness of the input image and the reference image are known beforehand, an output from the computer 32 is directly changed and executed. In practical use, a means for partially branching the light such as a beam splitter is provided immediately after a means such as a liquid crystal television 35 for entering the input image and the reference image into an optical system, lights corresponding to the input image and the reference image among thus split lights are independently converged and measured to determine each size of the images, thereby brightness of the input image and the reference image displayed on the liquid crystal television 35 are determined in practical manner. It is important that the light is prevented from transmitting through then displayed background of the image (a portion other than the image) as much as possible, thus deterioration of a visibility of the joint Fourier transform image is eliminated. It is referred to as "a normalization of the input image" to suppress lowering of the visibility of the joint Fourier transform image by rendering input intensity of the input image and the reference image same.

Figure 15:
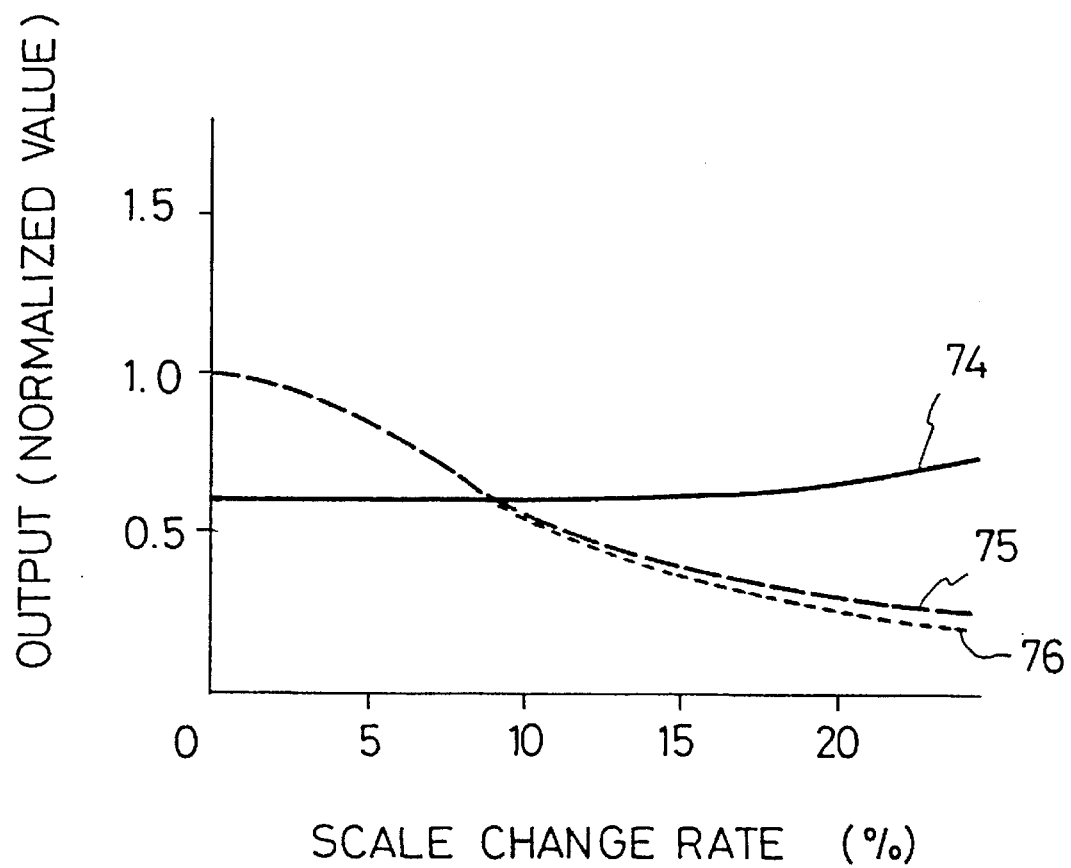
FIG. 15 is a graphical representation showing a relationship for a correlation coefficient from a higher-frequency component, a correlation coefficient from a lower-frequency component, and a correlation coefficient ratio each relative to size change of a reference image where a joint Fourier transform image is not binarized.

FIG. 15 is a graphical representation showing a relationship of the correlation coefficient 75 corresponding to the lower-frequency component, the correlation coefficient 76 corresponding to the higher-frequency component, and the correlation coefficient ratio 74 respectively relative to the scale change rate of the input image when applying the optical pattern recognition apparatus in FIG. 3 using the normalization of the input image described in the above. As is apparent from FIG. 15, the correlation coefficient 75 corresponding to the lower-frequency component and the correlation coefficient 76 corresponding to the higher-frequency component, if the scale change rate comes about 12%, are reduced to an about half value, while the correlation coefficient ratio 74 exhibits a variation of 10% for the first time when the scale change rate becomes about 22%.

Although this is somewhat lower in performance than the case where the joint Fourier transform image is written into the light addressed-type ferroelectric liquid crystal spatial light modulator as a continuous gradation image, the optical pattern recognition apparatus of the invention is found to have extremely upgraded pattern recognition capability particularly in size change of the input image or the reference image compared to the conventional joint transform correlator. The optical pattern recognition apparatus or the optical pattern recognition method according to the invention on the basis of the binarization joint transform correlator comes to exhibit a high grade of pattern recognition capability by entering the normalized input image and reference image even in occurrence of a size change of the input image or the reference image.

Figure 2:
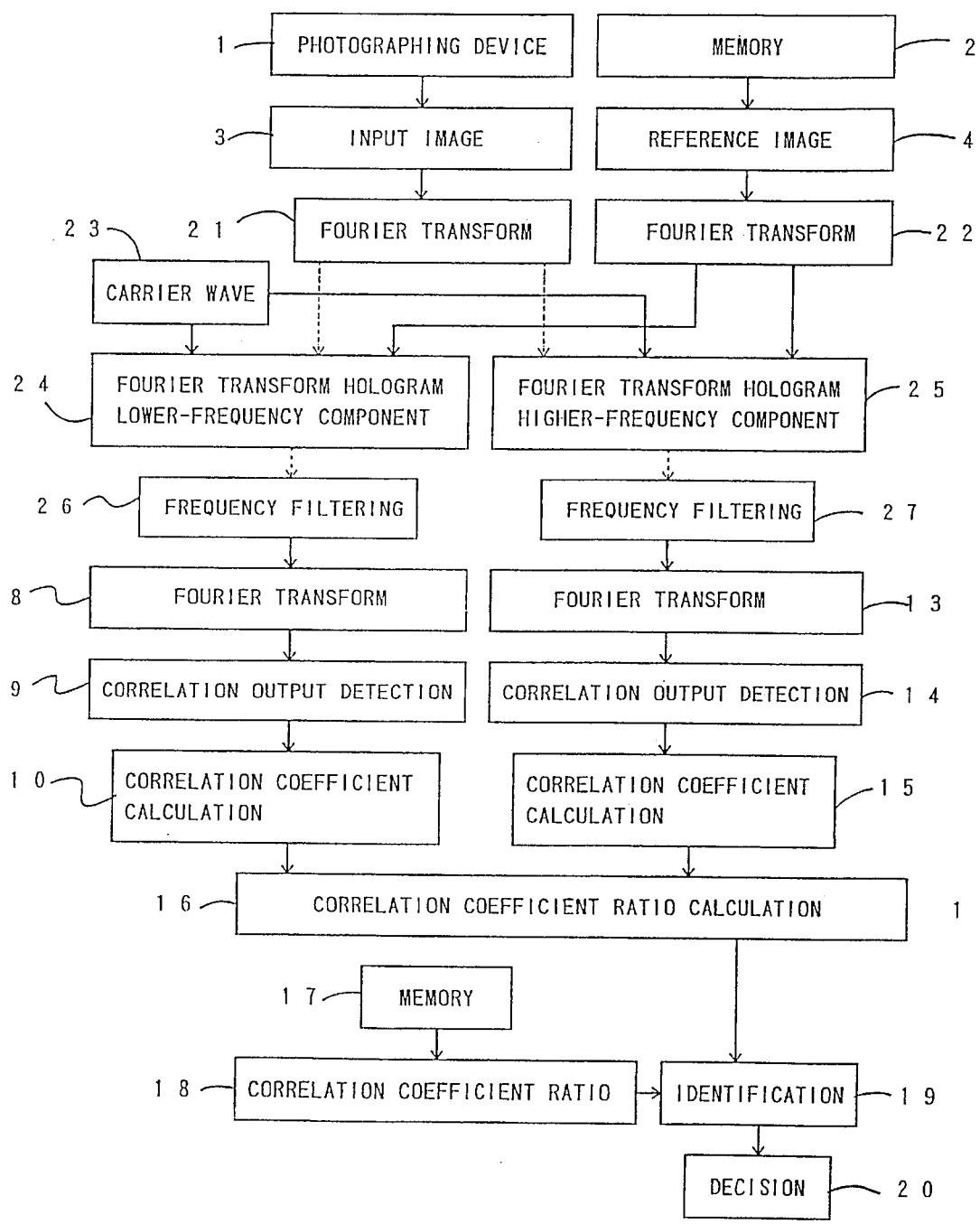
FIG. 2 is a flow chart showing a flow of an optical pattern recognition method of the invention using a matched filter-type optical correlator.

The optical pattern recognition method and the optical pattern recognition apparatus according to the invention have hereinbefore been described for the optical system based on the joint transform correlator. One embodiment of the optical pattern recognition method and the optical pattern recognition apparatus according to the invention are explained using an optical system based on a matched filter-type optical correlator. FIG. 2 is a flow chart showing one embodiment of an optical pattern recognition method of the invention based on the matched filter-type optical correlator.

The same numerals are given to the elements in FIG. 2 having the same operation as in FIG. 1. In FIG. 2, a reference image 4 read from a memory 2 is converted into a coherent image by a coherent light such as a laser beam, and is thereafter optically Fourier transformed (22). The reference image thus optically Fourier transformed is superimposed with a coherent carrier wave (in most cases, a coherent plane wave) to be recorded in photographic films or light addressed-type spatial light modulators as a Fourier transform hologram. Such Fourier transform hologram to be recorded is formed only of its higher-frequency component or lower-frequency component (24, 25). Recording only for the lower-frequency component or higher-frequency component of the Fourier transform hologram is available by using a threshold characteristic of the light addressed-type ferroelectric liquid crystal spatial light modulator as described above or by masking of the photographic film.

An input image 3 read from image pick-up devices such as CCD cameras (a memory in computer is available) 1 is converted into a coherent image by a coherent light such as a laser and optically Fourier transformed (21). The Fourier transform of the input image is independently frequency filtered by the lower-frequency component of the reference image Fourier transform hologram and the higher-frequency component of the reference image Fourier transform hologram (26, 27). The Fourier transform image of the input image, which is frequency-filtered by the hologram of the lower-frequency component and the hologram of the higher-frequency component, is again Fourier transformed independently to be converted into the correlation function, and its correlation output is detected (9, 14). The pattern recognition method after then is the same as that of based on the joint transform correlator in FIG. 1, therefore the explanation thereof is omitted. However, the correlation coefficient ratio stored in the memory 17 is a correlation coefficient ratio obtained using the reference image instead of the input image at steps other than steps 17 to 20 in FIG. 2.

A different point of this method from a method based on the joint transform correlator resides in that a visibility of the interference fringes, when the Fourier transform hologram is formed, does not take a higher value for a region having proper light intensity, and selection of the carrier wave component is performed with a relatively higher freedom within a range of resolution of the spatial light modulator. To Fourier transform individually the input image and the reference image, it is not necessary to synthesize these on entering, or to use two sets of electrically addressed-type spatial light modulators such as liquid crystal televisions.

Figure 4:
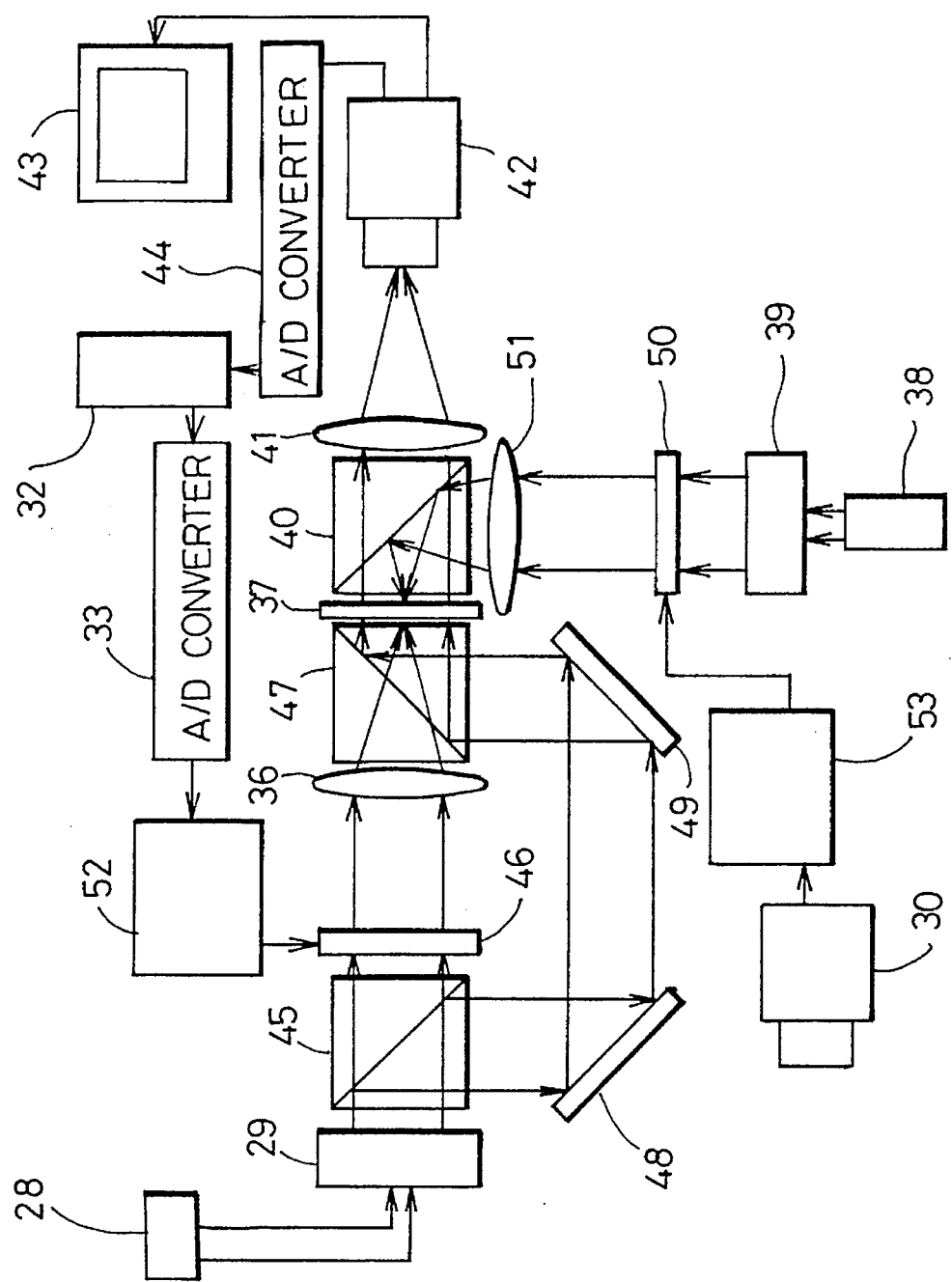
FIG. 4 is a view showing a configuration of one embodiment of an optical pattern recognition apparatus of the invention using a matched filter type-correlator.

FIG. 4 shows one embodiment of the optical pattern recognition apparatus of the invention based on the matched filter-type optical correlator in FIG. 2. In FIG. 4, reference numeral 44 depicts an A/D converter, 45 a first beam splitter, 46 a first liquid crystal television, 47 a second beam splitter, 48 a first mirror, 49 a second mirror, 50 a second liquid crystal television, 51 a third Fourier transform lens, 52 a first liquid crystal television driving circuit and 53 a second liquid crystal television driving circuit.

In FIG. 4, the same numerals are given to the constituent elements having the same operations as in FIG. 3, therefore the explanation thereof is omitted. In FIG. 4, the reference image stored in memory of the computer 32 is converted into analog electric signals at the D/A converter 33 to be displayed on the first liquid crystal television 46 through the first liquid crystal television driving device 52.

The laser beam emitted from the writing laser 28 is enlarged to a suitable beam-diameter by the first beam expander 29, a part thereof is transmitted through the first beam splitter, thereafter irradiates the reference image displayed on the first liquid crystal television 46 to convert it into the coherent optical image. The reference image converted into the coherent light image is Fourier transformed on a write plane of the light addressed type ferroelectric liquid crystal spatial light modulator 37 by the first Fourier transform lens 36 through the second beam splitter 47.

The laser beam reflected a part thereof on the first beam splitter 45 is reflected sequentially on the first mirror 48, the second mirror 49, and the second beam splitter 47, to become a plane wave, and to irradiate the input plane of the light addressed type ferroelectric liquid crystal spatial light modulator 37. The Fourier transform image of reference image and the corresponding plane wave interfere each other on the writing plane of the light addressed type ferroelectric liquid crystal spatial light modulator 37 to form interfere fringes and to record the reference image Fourier transform hologram on the corresponding light addressed type ferroelectric liquid crystal spatial light modulator 37. The plane wave corresponds to the carrier wave when the corresponding Fourier transform hologram is formed, a largeness of the carrier wave component is readily determined by an angle formed by the plane wave optical axis with the reference image Fourier transform hologram optical axis.

As in the present embodiment, when the light addressed type ferroelectric liquid crystal spatial light modulator is used as a medium for recording the Fourier transform hologram of the corresponding reference image, an angle formed by an optical axis of the plane wave and an optical axis of the Fourier transform hologram of the reference image is approximately equal to or less than 9 degrees. Then, as in the embodiment in FIG. 3, the driving voltage waveform in FIG. 7 is applied to the light addressed type ferroelectric liquid crystal spatial light modulator 37 to suitably select an output of the writing laser 28, whereby, as the Fourier transform hologram of the reference image recorded in the corresponding light addressed type ferroelectric liquid crystal spatial light modulator 37, there can independently be obtained a Fourier transform hologram having its lower-frequency component as a main component and a Fourier transform hologram having its higher-frequency component as a main component.

The input image containing a target image is obtained by the first CCD camera 30 and converted into the electric signals to be displayed on the second liquid crystal television 50 through the second liquid crystal television driving circuit 53. The laser beam emitted from the reading laser 38 is converted into a suitable beam diameter by the second beam expander 39 and irradiates the input image displayed on the second liquid crystal television 50 to convert it into a coherent optical image. The input image converted into this coherent optical image is Fourier transformed on a output plane of the light addressed type ferroelectric liquid crystal spatial light modulator 37 through the polarizing beam splitter 40 by the third Fourier transform lens 51. At this time, to perform the pattern recognition having a higher SN ratio, an optical axis of the Fourier transform of the reference image is required coincident to an optical axis of the corresponding input image as much as possible.

The optical image thus read out is diffracted in the same optical axis direction as the plane wave. This read-out image is no more than the result that the Fourier transform of the input image is frequency filtered by the Fourier transform hologram of the reference image. The Fourier transform image of the input image thus frequency filtered is converted into the optical intensity image by being transmitted through the polarizing beam splitter 40, and this is again Fourier transformed on the photoelectric conversion plane of the second CCD camera 42 by the second Fourier transform lens 41 to become a correlation function and a convolution function of the input image and the reference image. This correlation function is photoelectric converted into digital electric signals by the A/D converter 44 and thereafter stored in memory of the computer 32.

The correlation signals stored in memory of the computer 32 are again read by the computer 32, a maximum value of a correlation peak contained in the correlation function is calculated and again stored in memory of the computer 32 as a correlation coefficient. The correlation coefficient then obtained becomes the correlation coefficient corresponding to the lower-frequency component when the Fourier transform hologram of the reference image is mainly formed of the lower-frequency component, and on the other hand becomes the correlation coefficient corresponding to the higher-frequency component when the Fourier transform hologram of the reference image is mainly formed of the higher-frequency component. The correlation coefficient corresponding to the lower-frequency component and the correlation coefficient corresponding to the higher-frequency component are read from memory of the computer 32 and the correlation coefficient ratio that is a ratio thereof is calculated in the computer 32.

The correlation coefficient ratio of the input image and the reference image thus computed is sequentially compared with the correlation coefficient ratios obtained from among the reference images previously stored in memory of the computer, as a result of such comparison, it can be determined whether or not the input image is coincident to the reference image.

In this way, as shown in FIGS. 13 to 15, there has been investigated the characteristic exhibited by the optical pattern recognition apparatus of the invention when the input image rotates or its size is changed, where substantially the same result has been obtained.

Of course, it is apparent that the same result is obtained in FIG. 4 when the input image is fed to the first liquid crystal television 46 and the reference image is fed to the second liquid crystal television 50.

Figure 9:
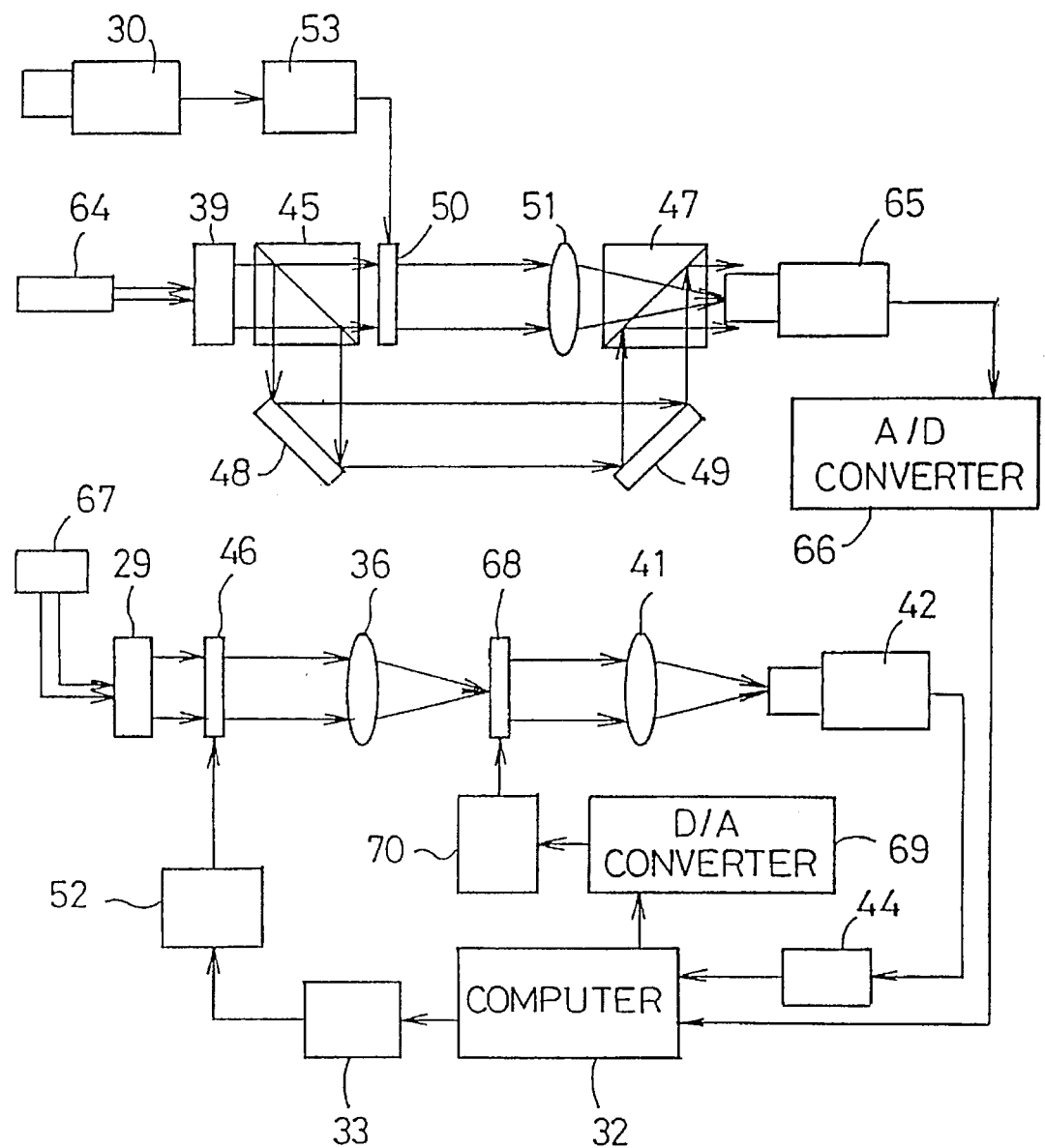
FIG. 9 is a view showing a configuration of one embodiment of an optical pattern recognition apparatus of the invention using a matched filter-type optical correlator without using a light addressed-type ferroelectric liquid crystal spatial light modulator.

Next, an embodiment is explained wherein the optical pattern recognition is performed using a CCD camera and a liquid crystal television as a recording medium of the Fourier transform hologram in stead of the light addressed type ferroelectric liquid crystal spatial light modulator. FIG. 9 is a view showing a configuration of one embodiment thereof, where 64 depicts a first laser, 65 a third CCD camera, 66 an A/D converter, 67 a second laser, 68 a third liquid crystal television, 69 a D/A converter, and 70 a third liquid crystal television driving circuit.

In FIG. 9, the same numerals are given to the constituent elements having the same operation as in FIG. 4, therefore the explanation thereof is omitted. In FIG. 9, an image containing an input image taken from the first CCD camera 30 (hereafter referred to as "input image" for simplification) is displayed on the second liquid crystal television 50 through the second liquid crystal television driving circuit 53. On the other hand, a coherent light emitted from the first laser 64, whose beam diameter is converted into a suitable value by the second beam expander 39, is transmitted partially through the first beam splitter 45 to convert the input image displayed on the second liquid crystal television 50 into a coherent optical image. The input image converted into this coherent optical image is Fourier transformed on a photoelectric conversion plane of the third CCD camera 65 through the second beam splitter 47 by the third Fourier transform lens 51. Still on the other hand, the coherent light reflected partially on the first beam splitter 45 is reflected sequentially on the first mirror 48, the second mirror 49, and the second beam splitter 47 and irradiated as a carrier wave on the photoelectric conversion plane of the third CCD camera 65.

As in the embodiment in FIG. 4, the Fourier transform and the carrier wave of the input image are interfered each other to form the Fourier transform hologram of the input image on the photoelectric conversion plane of the third CCD camera 65. An angle formed by the optical axis of the Fourier transform of the input image and the optical axis of the carrier wave is required to be smaller enough to form the interference fringes which is larger enough in comparison with a pixel pitch of the third CCD camera 65.

The Fourier transform hologram of the input image thus obtained by the third CCD camera 65 is converted into the digital electric signals by the A/D converter 66 and stored in memory of the computer 32. The Fourier transform hologram of the input image stored in the computer 32 is extracted of only its higher-frequency region and lower-frequency region by the computer 32.

This may preferably be, for example, that the Fourier transform hologram of the input image inside a circular region which is set to have a specified radius from the optical axis is made the lower-frequency component of the Fourier transform hologram of the corresponding input image and the remaining region is made the higher-frequency component of the Fourier transform hologram of the input image. In this manner, the lower-frequency component and the higher-frequency component of the Fourier transform hologram of the extracted input image are independently converted into the analog electric signals by the D/A converter 69 and then displayed on the third liquid crystal television 68 through the third liquid crystal television driving circuit 70. Then, the lower-frequency component and the higher-frequency component of the input image displayed on the third liquid crystal television come to images having the continuous gradation within a range of a gamma characteristic which is determined by the CCD camera and liquid crystal television and electric circuit.

The digital electric signals corresponding to the reference image are fed to the D/A converter 33 from the computer 32 to be converted into the analog electric signals, further the resultant is fed to the first liquid crystal television 46 through the first liquid crystal television driving circuit 52, on which the reference image is displayed.

The coherent light emitted from the first laser 67, whose beam diameter is enlarged to a proper value by the first beam expander 29, irradiates the reference image displayed on the first liquid crystal television 46 to convert it into a coherent optical image. The reference image converted into the coherent optical image is Fourier transformed by the first Fourier transform lens 36 to be irradiated on the lower-frequency component of the input image or the higher-frequency component of the input image each displayed on the third liquid crystal television 68, where the first liquid crystal television 46 and the third liquid crystal television 68 are arranged on the front focal plane and the back focal plane of the first Fourier transform lens 36 respectively. Most efficient frequency-filtering is available when a relationship between a display surface of the third liquid crystal television 68 and an optical axis of the Fourier transform of the reference image is completely identical to a relationship between a photoelectric conversion plane of the third CCD camera 65 and an optical axis of the Fourier transform of the input image (an incident angle and an incident position).

The Fourier transform of the reference image, which is frequency-filtered by the lower-frequency component and the higher-frequency component of the Fourier transform of the input image, is again Fourier transformed by the second Fourier transform lens 41 to produce a correlation peak on the photoelectric conversion plane of the second CCD camera 42. The correlation peaks, which are obtained independently from the lower-frequency component and the higher-frequency component of the Fourier transforms of these input images, are converted into the digital electric signals by the A/D converter 44, thus as in the embodiment of FIG. 4, the correlation coefficients and the correlation coefficient ratios corresponding thereto within the computer 32 can be obtained.

For the embodiment in FIG. 9, a result of performing the pattern recognition using alphabetic characters as the input image and reference image is described. When the input image rotates by about 6 degrees relative to the reference image, a correlation coefficient value corresponding to its lower-frequency component is reduced to about ½ than ever, but a value of the correlation coefficient ratio is kept not decreased to ½ than ever until the input image rotates up to the amount of about 12 to 16 degrees relative to the reference image.

When a size of the input image is varied by about 5% relative to that of the reference image, a value of the correlation coefficient corresponding to its lower-frequency component is reduced to about ½ than ever, however, a value of the correlation coefficient ratio is kept not decreased to ½ than ever until the input image varies by up to about 12 to 15% relative to the reference image. These results show a degraded characteristic compared to the case using the light addressed type ferroelectric liquid crystal spatial light modulator as a means for displaying the Fourier transform hologram or the joint Fourier transform image, but this is because a solution of the liquid crystal television used for displaying the Fourier transform hologram is equal to as low as about 9 lines pair/mm. This is not an essential problem. In this embodiment, important is an effect capable of producing with a larger freedom on software the lower-frequency component and the higher-frequency component of the Fourier transform hologram.

The embodiment has hereinbefore been described wherein the optical pattern recognition method and the optical pattern recognition apparatus of the invention are applied to the optical correlation based on the Fourier transform. One embodiment is hereinafter described wherein the present invention can be applied to a method of optical pattern recognition by measuring intensity after the Fourier transform image of the input image is filtered by the Fourier transform image of the reference image.

Figure 10:
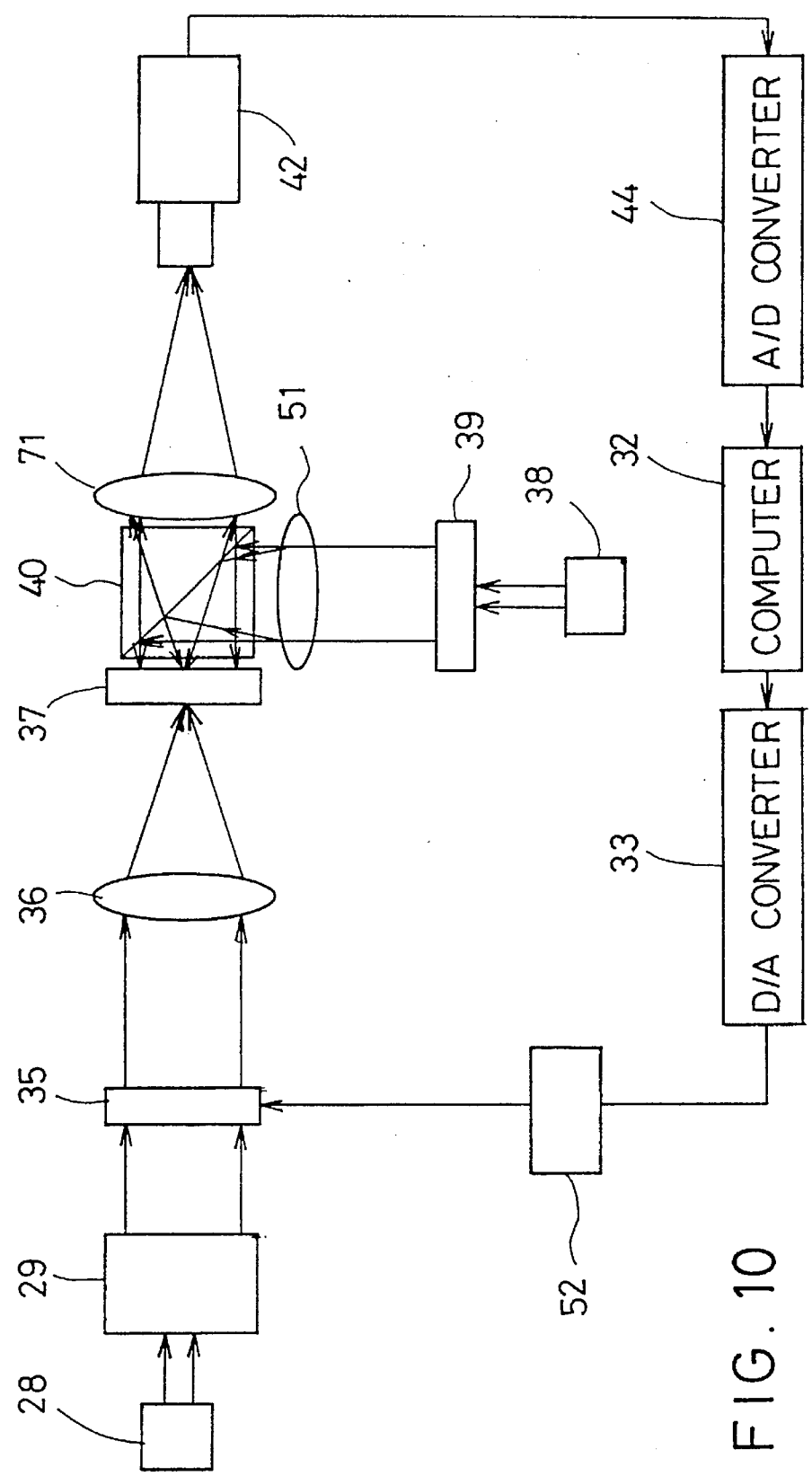
FIG. 10 is a view showing a configuration of one embodiment of an optical pattern recognition method of the invention using frequency-filtering of a Fourier transform image.

As shown in FIG. 10, the optical system for performing the optical pattern recognition is shown, where a different point from in FIGS. 4 and 9 resides in that the first beam splitter 45, first mirror 48, second mirror 49 and second beam splitter 47 are not used. The second Fourier transform lens 41 is not required to Fourier transform the read image, but it uses a converging lens 71. Accordingly, what is obtained by the third CCD camera 65 or what is recorded and displayed in the light addressed type ferroelectric liquid crystal spatial light modulator 37, is the lower-frequency component and the higher-frequency component of the Fourier transform of the input image or the reference image, and not the lower-frequency component and the higher-frequency component of the Fourier transform hologram of the input image or the reference image.

What is obtained by the second CCD camera 42 and measured, calculated, and compared by the computer 32, is entire intensity and entire intensity ratio of the lower-frequency component and the higher-frequency component of the Fourier transform image of the input image or the reference image thus frequency-filtered in the above, and not the correlation coefficient and the correlation coefficient ratio of the input image and the reference image. A negative image of the Fourier transform image of the reference image is recorded and displayed on the light addressed type ferroelectric liquid crystal spatial light modulator 37 and the Fourier transform image of the input image is reflected only from a portion different from the Fourier transform pattern of the input image. An operation of an optical pattern recognition apparatus in the present embodiment is the same as that of the optical pattern recognition apparatus of the embodiment shown in FIGS. 4 and 9, therefore the explanation in detail thereof is omitted.

In this way, the lower-frequency component of the Fourier transform of the input image can be obtained from the light addressed type ferroelectric liquid crystal spatial light modulator 37 recorded of the higher-frequency component of the Fourier transform image of the reference image, and the higher-frequency component of the Fourier transform of the input image can be obtained from the light addressed type ferroelectric liquid crystal spatial light modulator 37 recorded of the lower-frequency component of the Fourier transform of the reference image. For this reason, when the input image and the reference image are completely coincident to each other of its size and rotation direction, an entire intensity obtained from the lower-frequency component or the higher-frequency component of the input image comes minimum. The entire intensity increases with a larger difference between the input image and the reference image, and with a larger difference between sizes of the input image and the reference image, and further with a larger rotation angle of the reference image relative to the input image.

However, an entire intensity ratio that is a ratio of entire intensity corresponding to the lower-frequency component versus entire intensity corresponding to the highest-frequency component each using a method of the invention is kept substantially constant, provided that those difference and rotation angle are a sufficiently small value even if the sizes of the input image and the reference image are different from each other or those have a relationship of differently rotating each other. The entire intensity ratio can be maintained substantially constant with a size difference of up to about 18 to 22% and with a rotation angle of up to about 18 to 20 degrees. The entire intensity ratio, which shows proper value for the input image or the reference image to be used, enables the optical pattern recognition by using such value.

The method of optical pattern recognition in this embodiment is not required to place the interference fringes for a carrier wave component on the Fourier transform plane as in the matched filter type optical correlator or the joint transform correlator. Accordingly, even if the spatial light modulator with a low resolution such as the liquid crystal televisions is used as a medium for recording the Fourier transform of the input image or the reference image, its pattern recognition capability is not remarkably deteriorated.

In the embodiments hereinbefore described, the examples using the alphabetic characters have been shown and described as an input image or a reference image. However, it is understood that the foregoing and various other images can be employed for the input image and the reference image of the optical pattern recognition method or optical pattern recognition apparatus of the present invention. However, even if an input image and a reference image having extremely periodical properties, whose Fourier transform image become a delta function or a kind of Shar($\equiv$ɯɯ)

function, is used for the optical pattern recognition apparatus of the invention, it is well known that the pattern recognition capability for these deformations is not so improved. This case may arise because $\delta_m(f \star g)$ or $\delta_j(f \star g)$ hereinbefore described comes larger enough to be non-negligible. However, such images hardly exist other than example such as the fine periodical patterns of semiconductor, hence the method and apparatus for optical pattern recognition according to the invention can be applied to most of applications of the pattern recognitions.

As hereinbefore fully described, the optical pattern recognition method and the optical pattern recognition apparatus according to the present invention, in the optical pattern recognition method and the optical pattern recognition apparatus by frequency-filtering the matched filter type optical correlator or the joint transform correlator or the Fourier transform image, the filter images recorded a matched filter plane or a joint Fourier transform plane or a Fourier transform plane thereof are separately recorded into the lower-frequency component and the higher-frequency component, and by pattern recognition using a ratio of discriminating signals obtained independently from a filter image corresponding to the lower-frequency component and a filter image corresponding to the higher-frequency component thus each separately recorded, there can be realized the optical pattern recognition which can overcome rotation and size change of the input image and the reference image.

The method and apparatus for the optical pattern recognition are capable of carrying out the pattern recognition at a real-time for an object having relatively small amount of rotation and size change using the practically useful spatial light modulators such as light addressed type ferroelectric liquid crystal spatial light modulators or liquid crystal televisions, therefore a great effect is obtained in inspecting electronics parts or mechanical parts or molded parts or the like on production lines of factories, or comparing roentgen photograph prints or finger-prints, or discriminating predetermined targets in the sights. Of course, a great effect is obtained for discriminating characters or numerals as shown and described in the embodiments according to the present invention.

What is claimed is:

1. An optical pattern recognition apparatus capable of automatically recognizing an input image by optical correlation processing using a coherent light for a two-dimensional input image obtained from an image pick-up means, the optical pattern recognition apparatus comprising: conversion means for converting at least one reference image and at least one input image into a coherent image; Fourier transform means for optically Fourier transforming the coherent image of the reference image and the input image and producing a corresponding Fourier transform image; filter forming means for independently forming a lower-frequency filter mainly formed of the lower-frequency component of a Fourier transform of the reference image and a higher-frequency filter mainly formed of the higher-frequency component of the reference image; filtering means for independently optically filtering a Fourier transform of the input image by the lower-frequency filter and the higher-frequency filter; correlation function means for independently obtaining a first correlation function corresponding to the lower-frequency filter and a second correlation function corresponding to the higher-frequency filter, the Fourier transform of the input image being optically filtered by the lower-frequency filter and the high-frequency filter being again optically Fourier transformed; a photodetector for converting signal intensity into corresponding electric signals by independently detecting the intensity of at least one first correlation peak contained in the first correlation function and the intensity of at least one second correlation peak contained in the second correlation function; calculating means for calculating a correlation coefficient ratio of the input image in accordance with a ratio of intensity of the first correlation peaks converted into the electric signals and intensity of the second correlation peaks converted into the electric signals; storage means for storing a correlation coefficient ratio of the reference image that is the intensity ratio of the correlation peaks, the correlation coefficient ratio being previously obtained from the Fourier transform of the reference image; and decision means for discriminating the input image by comparing the correlation coefficient ratio of the input image with the correlation coefficient ratio of the reference image previously stored.

2. An optical pattern recognition apparatus capable of automatically recognizing an input image by optical correlation processing using a coherent light for a two-dimensional input image obtained from image pick-up means, the optical pattern recognition apparatus comprising: conversion means for converting at least one reference image containing a required target and at least one input image into a coherent image; joint Fourier transform means for optically Fourier transforming the reference image and the input image and producing a corresponding joint Fourier transform image; power spectrum forming means for independently forming a lower-frequency joint power spectrum mainly formed of a lower-frequency component of the joint Fourier transform image and a higher-frequency joint power spectrum mainly formed of a higher-frequency component of the joint Fourier transform image by independently recording and displaying the lower-frequency component and the higher-frequency component of the joint Fourier transform; correlation function means for independently obtaining a first correlation function corresponding to the lower-frequency joint power spectrum and a second correlation function corresponding to the higher-frequency joint power spectrum, the lower-frequency joint power spectrum and the higher-frequency joint power spectrum being independently optically Fourier transformed; a photodetector for converting signal intensity into corresponding electric signals by independently detecting the intensity of at least one first correlation peak contained in the first correlation function and the intensity of at least one second correlation peak contained in the second correlation function; calculation means for calculating a correlation coefficient ratio of the input image that is a ratio of the intensity of the first correlation peaks converted into the electric signals and the intensity of the second correlation peaks converted into the electric signals; storage means for storing the correlation coefficient ratio of the reference image, the correlation coefficient ratio being the intensity ratio of the correlation peaks relating to a comparison of two identical reference images; and decision means for discriminating the input image by comparing the correlation coefficient ratio of the input image with the correlation coefficient ratio of the reference image stored in the storage means.

3. An optical pattern recognition apparatus according to claim 1 or 2; wherein the conversion means for converting at least one reference image and at least one input image into a coherent image comprises normalization means for normalizing the reference image and the input image so that the light intensity of the coherent images of respective reference images and input images are equal to each other.

4. An optical pattern recognition apparatus according to claim 1 or 2; wherein the conversion means for converting at least one reference image and at least one input image into a coherent image comprises normalization means for normalizing the reference image and the input image so that the light intensity of the coherent images of respective reference images and input images are equal and constant to each other.

5. An optical pattern recognition apparatus according to claim 1; wherein the filter forming means for independently forming the lower-frequency filter and the higher-frequency filter includes means for supplying a writing light, means for supplying a reading light, voltage applying means, and a light addressed-type ferroelectric liquid crystal spatial light modulator comprising a ferroelectric liquid crystal composition provided in a gap between opposing substrates, the respective substrates each comprising a glass substrate on which is formed a hydrogenated amorphous silicon photoconductive film and a transparent electrode, and wherein liquid crystal alignment films are formed on respectively opposing surfaces of the glass substrates formed with a transparent electrode.

6. An optical pattern recognition apparatus according to claim 3; wherein the power spectrum means for independently forming the lower-frequency joint power spectrum and the higher-frequency joint power spectrum includes means for supplying a writing light, means for supplying a reading light, voltage applying means, and a light addressed-type ferroelectric liquid crystal spatial light modulator comprising a ferroelectric liquid crystal composition which is provided in a gap between opposing substrates, the respective substrates each comprising a glass substrate on which a hydrogenated amorphous silicon photoconductive film is formed on a transparent electrode, and wherein liquid crystal alignment films are formed on respectively opposing surfaces of the glass substrates formed with a transparent electrode.

7. An optical pattern recognition apparatus according to claim 1; wherein the filter forming means for independently forming the lower-frequency filter and the higher-frequency filter comprises image pick-up means comprising a photoelectric conversion plane arranged in a matrix, analog/digital conversion means for converting an analog image picked-up by image pick-up means into a digital image, a computer having means for masking a predetermined region of a digital image converted by the analog/digital conversion means, a digital/analog converter for converting the digital image masked in the predetermined region into an analog image, and a light addressed-type spatial light modulator for displaying the analog image converted by the digital/analog converter.

8. An optical pattern recognition apparatus according to claim 3; wherein the power spectrum means for independently forming the lower-frequency joint power spectrum and the higher-frequency joint power spectrum comprises image pick-up means comprising a photoelectric conversion plane arranged in a matrix, analog/digital conversion means for converting an analog image picked-up by image pick-up means into a digital image, a computer having means for masking a predetermined region of a digital image converted by the analog/digital conversion means, a digital/analog converter for converting the digital image masked in the predetermined region into an analog image, and a light addressed-type spatial light modulator for displaying the analog image converted by the digital/analog converter.

9. An optical pattern recognition apparatus according to claim 3; wherein the normalization means includes a semiconductor laser, a beam splitter, a photodetector, and a liquid crystal mask.

10. A method of optical pattern recognition for automatically recognizing a required pattern by optical correlation processing using a coherent light for a two-dimensional image obtained from an image pick-up device, the method of optical pattern recognition comprising the steps of: converting at least one reference image and at least one input image into a coherent image; optically Fourier transforming the coherent image to independently obtain a joint Fourier transform image of the reference image and the input image; independently forming a lower-frequency filter formed mainly of a lower-frequency component of a Fourier transform of the reference image and higher-frequency filter formed mainly of a higher-frequency component of a Fourier transform of the reference image; independently optically filtering the Fourier transform of the input image using the lower-frequency filter and the higher-frequency filter; optically Fourier transforming the input image optically filtered by the lower-frequency filter and the higher-frequency filter to independently obtain a first correlation function corresponding to the lower-frequency filter and a second correlation function corresponding to the higher-frequency filter; independently detecting the intensity of at least one first correlation peak contained in the first correlation function and the intensity of at least one second correlation peak contained in the second correlation function and converting the at least one first correlation peak and the at least one second correlation peak into corresponding electric signals; calculating a correlation coefficient ratio of the input image in accordance with a ratio of the first correlation peaks converted into electric signals and the second correlation peaks converted into electric signals; independently optically filtering the reference image Fourier transform by the lower-frequency filter and the higher-frequency filter; optically Fourier transforming the reference image that has been Fourier transform optically filtered by the lower-frequency filter and the higher-frequency filter to obtain independently a third correlation function corresponding to the lower-frequency filter and a fourth correlation function corresponding to the higher-frequency filter; independently detecting the intensity of at least one third correlation peak contained in the third correlation function and the intensity of at least one fourth correlation peak contained in the fourth correlation function and converting the at least one third correlation peak and the at least one fourth correlation peak into corresponding electric signals; storing a previously determined correlation coefficient ratio of the reference images that is a ratio of the intensity of the third correlation peaks converted into electric signals and the intensity of the fourth correlation peaks converted into electric signals; and discriminating the input image by comparing the correlation coefficient ratio of the input image and the correlation coefficient ratio of the reference image previously stored.

11. A method of optical pattern recognition for automatically recognizing a required pattern by optical correlation processing using a coherent light for a two-dimensional image obtained from an image pick-up device, the method of optical pattern recognition comprising the steps of: converting at least one reference image and at least one input image into a coherent image; producing a joint Fourier transform image of the reference image and the input image by simultaneously optically Fourier transforming the coherent image; independently recording a lower-frequency component and a higher-frequency component of the joint Fourier transform; independently forming a lower-frequency joint power spectrum mainly formed of the lower-frequency component of the joint Fourier transform and a higher-frequency joint power spectrum mainly formed of the higher-frequency component of the joint Fourier transform; independently optically Fourier transforming the lower-frequency joint power spectrum and the higher-frequency joint power spectrum; producing independently a first correlation function corresponding to the lower-frequency joint power spectrum and a second correlation function corresponding to the higher-frequency joint power spectrum; independently detecting the intensity of at least one first correlation peak contained in the first correlation function and the intensity of at least one second correlation peak contained in the second correlation function and converting the at least one first correlation peak and the at least one second correlation peak into corresponding electric signals; calculating a correlation coefficient ratio of the input image that is a ratio of the intensity of the first correlation peaks converted into electric signals and the intensity of the second correlation peaks converted into electric signals; independently forming a lower-frequency joint power spectrum and a higher-frequency joint power spectrum using the joint Fourier transform formed by simultaneously optically Fourier transforming two identical reference images each being independently optically Fourier transformed; producing independently a third correlation function corresponding to the lower-frequency joint power spectrum and a fourth correlation function corresponding to the higher-frequency joint power spectrum; independently detecting the intensity of at least one third correlation peak contained in the third correlation function and the intensity of at least one fourth correlation peak contained in the fourth correlation function; converting the detected third and fourth correlation peaks into corresponding electric signals; storing a previously determined correlation coefficient ratio of the reference image in accordance with a ratio of the intensity of the third correlation peaks and the intensity of the fourth correlation peaks converted into electric signals; and determining the input image by comparing the correlation coefficient ratio of the input image with the correlation coefficient ratio of the reference image previously stored.

12. A method of optical pattern recognition according to claim 10 or 11; further comprising the steps of converting at least one reference image and at least one input image into a coherent image, and normalizing the intensity of coherent images of respective reference images and input images.

13. A method of optical pattern recognition according to claim 10 or 11; further comprising the steps of converting at least one reference image and at least one input image into a coherent image, and normalizing the intensity ratio of coherent images of respective reference images and input images.

* * * * *